United States Patent
George et al.

(10) Patent No.: US 11,406,003 B2
(45) Date of Patent: Aug. 2, 2022

(54) LIGHTING SYSTEM FOR LOCATING WIRELESS FLOOR BEACONS IN A SPACE

(71) Applicant: ABL IP HOLDING LLC, Conyers, GA (US)

(72) Inventors: Sajin George, Somerville, MA (US); Mitri J. Abou-Rizk, Newton, MA (US); Emanuel Paul Malandrakis, Boston, MA (US); Sean Serpa, Quincy, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 54 days.

(21) Appl. No.: 17/011,000

(22) Filed: Sep. 3, 2020

(65) Prior Publication Data

US 2022/0070990 A1 Mar. 3, 2022

(51) Int. Cl.
  *H05B 47/195* (2020.01)
  *H04W 4/33* (2018.01)
  *H04W 4/80* (2018.01)

(52) U.S. Cl.
  CPC .......... *H05B 47/195* (2020.01); *H04W 4/33* (2018.02); *H04W 4/80* (2018.02)

(58) Field of Classification Search
  CPC ......... H05B 47/195; H04W 4/33; H04W 4/80
  See application file for complete search history.

(56) References Cited

U.S. PATENT DOCUMENTS

| | | | |
|---|---|---|---|
| 8,928,232 B2 * | 1/2015 | Aggarwal | H05B 47/11 315/153 |
| 9,287,976 B2 | 3/2016 | Ganick et al. | |
| 10,410,238 B2 | 9/2019 | Walden | |
| 2018/0027598 A1 * | 1/2018 | Roquemore, III | H04W 76/10 370/254 |

* cited by examiner

*Primary Examiner* — Daniel D Chang
(74) *Attorney, Agent, or Firm* — RatnerPrestia

(57) ABSTRACT

In response to receiving a lighting system element request message from a gateway to detect a subset or all wireless RF floor beacons in the space, a lighting system element receives via a local wireless communication network, a respective floor beacon identification message including a detected respective wireless RF beacon identifier transmitted from a detected respective wireless RF floor beacon. The lighting system element determines a respective RF signal strength between the detected respective wireless RF floor beacon from the respective lighting system element based on the respective floor beacon identification message. The lighting system elements transmits, via the local wireless communication network, to the gateway a respective lighting system element report message including the detected respective wireless RF beacon identifier of the detected respective wireless RF floor beacon, the respective RF signal strength, and the respective lighting system element identifier.

18 Claims, 12 Drawing Sheets

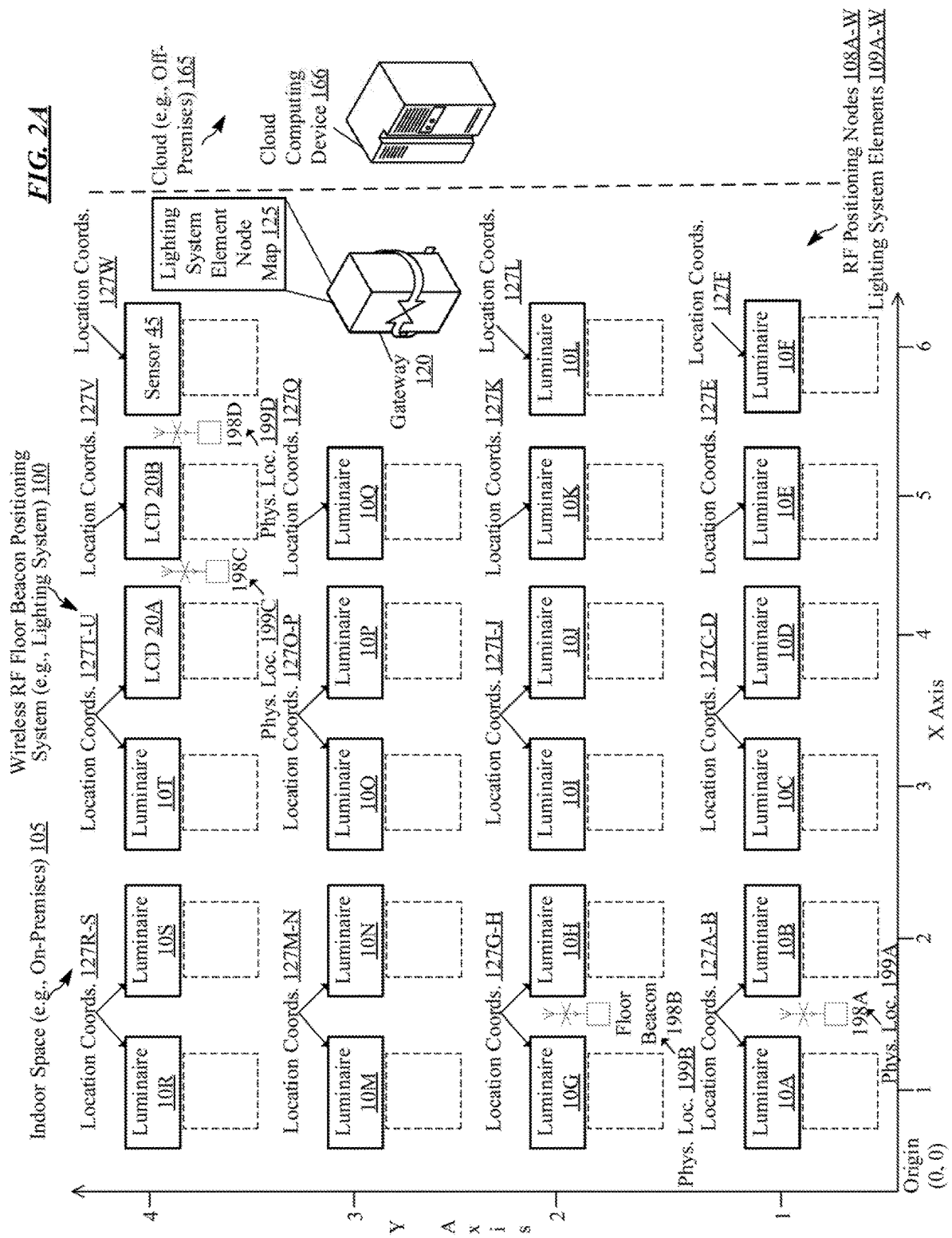

*FIG. 2B*

Lighting System Element Node Map 125

| Lighting System Element Position | Lighting System Element Identifier | Set of Location Coordinates 127A-W | |
|---|---|---|---|
| | | X Location Coordinate | Y Location Coordinate |
| 1 | 109A | 1 | 1 |
| 2 | 109B | 2 | 1 |
| 3 | 109C | 3 | 1 |
| 4 | 109D | 4 | 1 |
| 5 | 109E | 5 | 1 |
| 6 | 109F | 6 | 1 |
| 7 | 109G | 1 | 2 |
| 8 | 109H | 2 | 2 |
| 9 | 109I | 3 | 2 |
| 10 | 109J | 4 | 2 |
| 11 | 109K | 5 | 2 |
| 12 | 109L | 6 | 2 |
| 13 | 109M | 1 | 3 |
| 14 | 109N | 2 | 3 |
| 15 | 109O | 3 | 3 |
| 16 | 109P | 4 | 3 |
| 17 | 109Q | 5 | 3 |
| 18 | 109R | 1 | 4 |
| 19 | 109S | 2 | 4 |
| 20 | 109T | 3 | 4 |
| 21 | 109U | 4 | 4 |
| 22 | 109V | 5 | 4 |
| 23 | 109W | 6 | 4 |

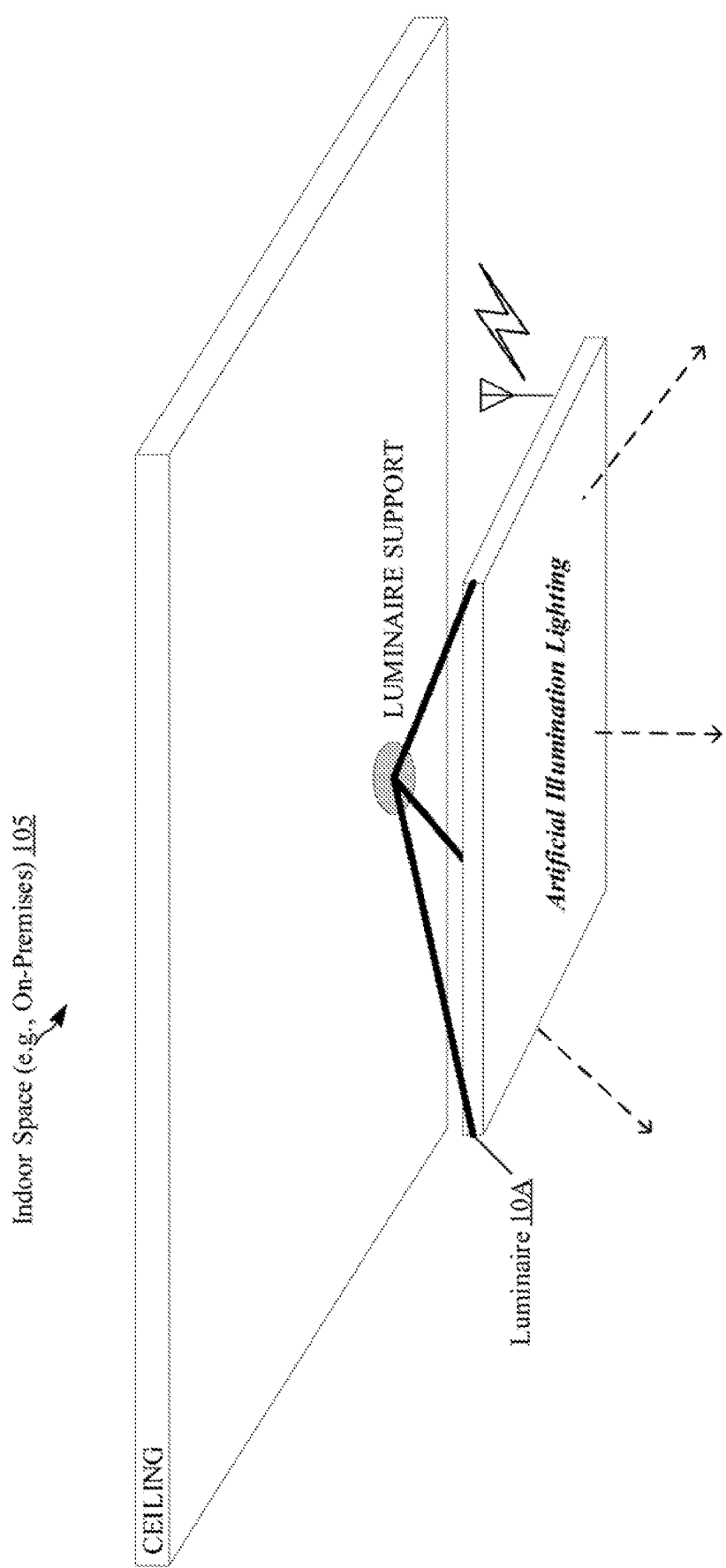

LIGHTING SYSTEM FOR LOCATING WIRELESS FLOOR BEACONS IN A SPACE

TECHNICAL FIELD

The present subject matter relates to a lighting system to track location of wireless floor beacons in a space by using radio frequency (RF) waves detected by lighting system elements of the lighting system.

BACKGROUND

To track the deployment of the floor displays—e.g., point of purchase (POP) displays associated with products and services within a space—a wireless radio frequency (RF) tracking device can be coupled to the floor display and then physically located within a space. A global positioning system (GPS) transceiver can be utilized as the wireless RF tracking device, but may not be effective at determining location within a floor plan of the space. Wireless RF floor beacons can be utilized as wireless RF tracking devices to track floor displays. The wireless RF floor beacons are coupled, e.g., attached, embedded, installed, or otherwise located on the floor displays or other objects to track location changes within the space. However, the wireless RF floor beacon itself is unable to track location of the floor display by itself and requires installing a variety of other RF communication devices within the space to track the physical location. Moreover, the deeper within the building (e.g., concrete structure) the wireless RF floor beacon coupled to the floor display is positioned, the weaker the RF signal to the wireless RF floor beacon becomes because the concrete and other building materials blocks and attenuate the RF signals. This increases the amount of other RF communication devices needing to be installed in the space to locate the wireless RF floor beacon and coupled floor display because of the attendant RF signal losses and weak signal strength.

Most spaces include artificial illumination lighting emitted by luminaires. Electrically powered artificial lighting for general illumination has become ubiquitous in modern society. Electrical lighting equipment is commonly deployed, for example, in homes, buildings of commercial and other enterprise establishments, as well as in various outdoor settings. Traditional luminaires can be turned ON and OFF, and in some cases may be dimmed, usually in response to user activation of a relatively simple input device. Often traditional luminaires are controlled individually or as relatively small groups at separate locations. More sophisticated lighting control systems automate the operation of the luminaires throughout a building or residence based upon preset time schedules, occupancy, and/or daylight sensing. Such lighting control systems receive sensor signals at a central lighting control panel, which responds to the received signals by deciding which, if any, relays, switching devices, and/or dimming ballasts to drive in order to turn on or off and/or adjust the light levels of one or more luminaires.

More recent lighting systems are wireless. Accordingly, a lighting system is needed to overcome these and other limitations in the art, including to track the location of wireless RF floor beacons within a space.

BRIEF DESCRIPTION OF THE DRAWINGS

The drawing figures depict one or more implementations, by way of example only, not by way of limitations. In the figures, like reference numerals refer to the same or similar elements.

FIG. 2A is a schematic of the luminaire-based positioning system of FIG. 1 that includes a visual layout of twenty-three commissioned luminaires as represented by a respective set of location coordinates, four wireless RF floor beacons as represented by a respective set of physical locations.

FIG. 2B is the lighting system element node map of the wireless RF floor beacon positioning system of FIGS. 1 and 2A depicted in a table format.

FIG. 3 is an isometric view of a luminaire mounted in the indoor space.

DETAILED DESCRIPTION OF THE DRAWINGS

Figure 1:
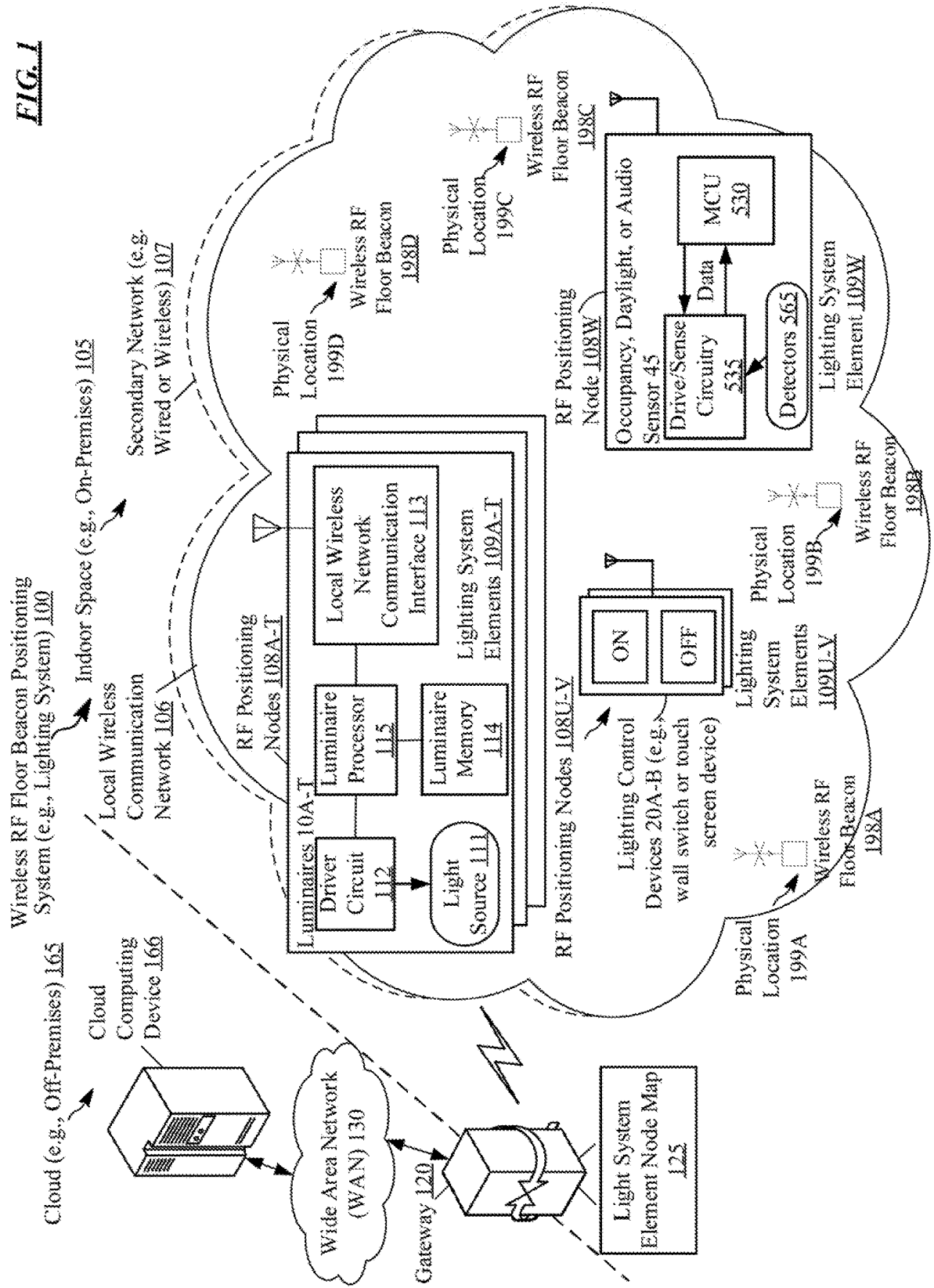
FIG. 1 is a high-level functional block diagram of an example of a wireless RF floor beacon positioning system of networks and lighting system elements that provide a variety of communications in support of identifying and determining a physical location of a wireless RF floor beacon in the indoor space.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, herein, the lighting system elements 109 are just one example of a radio frequency (RF) positioning node 108 with known location coordinates, which includes additional components; however, the locating of wireless RF floor beacons 198 can be applied to various other types of RF positioning nodes 108. Generally, the RF positioning node 108 includes a minimum subset of components of the luminaire 10A shown in FIG. 5, such as the local wireless network communication interfaces 113A-B (or other wired or wireless communication interfaces), memory 114 (including the depicted lighting system programming 116 and data), processor 115, and power supply 505. However, the RF positioning node 108 does not have to include the light source 111, driver circuit 112, drive/sense circuitry 535, and detector(s) 565 components. A wireless RF floor beacon 198 is an example of an RF identification tag that is a chip with a radio that emits a signal with a certain signal strength, small packets of information, and has a floor beacon identifier. RF positioning nodes 108 can be connected together via wired and/or wireless networks.

The examples in the drawings and described below relate to locating at least one or more wireless RF floor beacons 198 using a previously commissioned wireless RF floor beacon positioning system 100. During commissioning, a virtual map (element 125 of FIG. 2B) of a physical installation of RF lighting system elements (e.g., luminaires) within an indoor space of a room, building, etc. or an outdoor space (e.g., streetlights) is created. The devices and techniques described herein accept a list of wireless RF floor beacons 198, and then identify where, if any, of the listed wireless RF floor beacons 198 are located within the indoor space 105 or the outdoor space.

In an example, when a single wireless RF floor beacon is within a space along with a plurality of lighting system elements and a gateway, the plurality of lighting system elements receive a lighting system element request message to detect one or more wireless RF floor beacons, of which the wireless RF beacon identifier of the single wireless RF floor beacon is included. Next, the wireless RF floor beacon transmits a floor beacon identification message including the wireless RF beacon identifier of the wireless RF floor beacon within a respective RF range. A respective lighting system element within the space and within the respective RF range receives the floor beacon identification message, and in response determines a respective RF signal strength between the single wireless RF floor beacon and the respective lighting system element. Next, the respective lighting system element transmits to the gateway a respective lighting system element report message including the detected respective wireless RF beacon identifier, the respective RF signal strength, as well as the lighting system element identifier of the respective lighting system element.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "wireless RF floor beacon positioning system" or "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The RF positioning nodes may be nodes for wireless communication only. In many deployments, however, at least some of the RF positioning nodes have additional hardware for other purposes. For example, some nodes may include sensors, some nodes may include components to monitor or control equipment (e.g. equipment of a heating, ventilation and air conditioning system, access control system, surveillance and alarm system, or the like). For illustration and discussion purposes, some or all of the RF positioning nodes in the specific examples have additional hardware for lighting related purposes. Most such nodes may take the form of light fixtures or other types of luminaires that include light sources and associated driver circuitry, although some lighting system type nodes may include lighting related sensors (e.g. occupancy sensors and/or ambient light sensors), whereas other lighting system type nodes may include user interface hardware (e.g. to serve as wall-switches or wall controllers for user control of the luminaire nodes).

Software broadly encompasses executable program instructions and associated data if any that a programmable processor-based device utilizes to implement functions defined by the software. Various combinations of programming instructions and associated data fall under the broad scope of software. Firmware is a category of software. Although firmware may provide an operating environment for complex higher layer application programs; for a lower processing capacity device, such as an RF positioning node for a controlled system (e.g. fixture or other device in a lighting system), the firmware provides all the programming for the data processing and operational control of device hardware to implement the wireless communications and any other functions of the particular device.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. Examples of luminaires include light fixtures for indoor and outdoor applications, floor lamps and table lamps; although luminaire related aspects of the examples may be implemented in other forms of lighting devices. The actual source of illumination light in or supplying the light for a light fixture or other type of luminaire may be any type of artificial light emitting component, several examples of which are included in the discussions below.

The space, where the nodal wireless network is operating can include a variety of manmade structures or natural spaces modified by direct or indirect human efforts. The space conventionally may be a retail space, but it could also be, for example, an office space, a warehouse, or a hangar. It could also be an outdoor space with node installations, such as a parking lot, or a roadway. The space could also be a mixed use area, such as a transportation hub with both indoor and outdoor mesh network members, or an airport. A building space is a space that is partially or completely occupied by a structure.

The term "lighting system element" can include other elements such as electronics and/or support structure, to operate and/or install the particular node implementation. Such electronics hardware, for example, may include some or all of the appropriate driver(s) for any coupled illumination light source, any associated control processor or alternative higher level control circuitry, and/or data communication interface(s). As noted, the lighting component(s) are located into an integral unit, such as a light fixture or lamp implementation of the detector. The electronics for driving and/or controlling the lighting component(s) may be incorporated within the detector node or located separately and coupled by appropriate means to the light source component(s).

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as may be used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulb") of any suitable type. The illumination light output of an artificial illumination type luminaire, for example, may have an intensity and/or other characteristic(s) that satisfy an industry acceptable performance standard for a general lighting application.

Light output from the fixture or other type of luminaire may carry information, such as a code (e.g. to identify the luminaire or its location) or downstream transmission of communication signaling and/or user data. The light based data transmission may involve modulating or otherwise adjusting parameters (e.g. intensity, color characteristic or distribution) of the illumination light output from the device.

The term "node" may refer to an RF-enabled communication device that may provide communication services, e.g. for positioning services, building control system management services and the like. A node may be a connection point in a network that can receive, create, store and/or send data via communication links within the network. Each node is configurable to transmit, receive, recognize, process and originate and/or forward transmissions to other nodes, other devices operating as an access point to a network, or outside the network. The communication services provided by a node may enable networked and non-networked devices, such as asset tags, to send data to a node and receive data from the node.

Additionally, a "beacon positioning" system is a system that provides position estimation services and in some cases additional position or location based services over any relatively limited area. The area so served may be partly or entirely confined within a building, ship, mine, or other enclosed structure, but is not necessarily so confined. Hence, a "positioning system" may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces).

Reference now is made in detail to the examples illustrated in the accompanying drawings and discussed below.

FIG. 1 is a high-level functional block diagram of an example of a wireless RF floor beacon positioning system 100 of networks and lighting system elements 109A-W that provide a variety of communications in support of determining physical locations 199A-D of wireless RF floor beacons 198A-D in the indoor space 105. Although the example wireless RF floor beacon positioning system 100 is described for the indoor space 105, the wireless RF floor beacon positioning system 100 can be deployed in an outdoor space (e.g., using streetlights). As shown, wireless RF floor beacon positioning system 100 includes a plurality of lighting system elements 109A-W located in the indoor space 105, such as a grocery store. The wireless RF floor beacons 198A-D are utilized to determine whether a respective floor display 197A-D (see FIG. 4) or other object coupled to a respective wireless RF floor beacon 198A-D is properly deployed within the indoor space 105 or located within the appropriate part of the indoor space 105, rather than left in storage or otherwise mis-deployed.

A subset of the lighting system elements 109A-T are luminaires 10A-T. Each respective one of the luminaires 10A-T includes a light source 111 and a driver circuit 112 coupled to the light source 111 to control a light source operation. The light source 111 may be virtually any type of light source suitable to providing the intended type of light output that may be electronically controlled. The light source 111, for example, may provide visible light output as providing visible illumination for human occupancy or the like and/or visible light source based positioning. The light source 111 may be of the same general type in all of the luminaires 10A-T, e.g. all formed by some number of light emitting diodes (LEDs); although in many installations, some numbers of the luminaires 10A-T may have different types of light sources 111, e.g. some use LEDs, some use compact or tube type fluorescent sources, etc. Thus, the light source 111 can include one or more organic light emitting diodes (OLEDs); one or more micro LEDs; one or more nanorod or nanowire LEDs; at least one fluorescent lamp; or at least one halogen lamp.

In the examples herein, the luminaires 10A-T include at least one or more components forming a light source 111 for generating the artificial illumination light for a general lighting application as well as a local wireless network communication interface 113. In several illustrated examples, such luminaires 10A-T may take the form of a light fixture, such as a pendant or drop light or a downlight, or wall wash light or the like. For example, luminaires 10A-T include a pendant down light suspended/hanging from the ceiling, a 2×4 feet light fixture flush mounted on the ceiling, or sconces hung on the wall. Other fixture mounting arrangements are possible. For example, at least some implementations of the luminaire may be surface mounted on or recess mounted in a wall, ceiling or floor. Orientation of the luminaires 10A-T and components thereof are shown in the drawings and described below by way of non-limiting examples only. The luminaires 10A-T may take other forms, such as lamps (e.g. table or floor lamps or street lamps) or the like. Additional devices, such as fixed or controllable optical elements, may be included in the luminaire, e.g. to selectively distribute light from the illumination light source.

Each respective one of the luminaires 10A-T further includes a luminaire local wireless network communication interface 113 configured for wireless communication over a local wireless communication network 106. In the example, the local wireless communication network 106 can be a wireless mesh network (e.g., ZigBee, DECT, NFC, etc.), a personal area network (e.g., Bluetooth™ or Z-Wave), a visual light communication (VLC) network, or Wi-Fi. A VLC network is a data communications variant which uses visible light between 400 and 800 THz (780-375 nm), and is a subset of optical wireless communications technologies. Each respective one of the luminaires 10A-T further includes a luminaire memory 114 and a luminaire processor 115 coupled to the driver circuit 112, the luminaire local wireless network communication interface 113, and the luminaire memory 114. As further shown in FIG. 5, the luminaire local wireless network communication interface 113 may include separate radios that operate at two different frequencies, such as a first wireless transceiver 113B at sub-GHz (e.g., 900 MHz), and a second wireless transceiver 113A at Bluetooth™ Low Energy (BLE 2.4 GHz). In some examples, the luminaire local wireless network communication interface 113 can operate at 5 GHz.

It should also be understood that the communication protocols over the local wireless communication network 106 may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires 10A-T. The WAN 130 is a separate network but with a shared application protocol for wireless RF floor beacon locating. It should be appreciated, however, that local wireless communication network 106 and WAN 130 in a different implementation may be a different part of the same network tree or star network, and therefore may not be separate networks and can utilize the same network communication protocols. In some examples, the wireless RF floor beacon positioning system 100 can further include an optional secondary network 107 (e.g., wired or wireless), such as a LAN network for communication between the various RF positioning nodes 108A-W (e.g., lighting system elements 109A-W, such as luminaires 10A-T) and the gateway 120. In a first example, the local wireless communication network 106 for communciation between the RF positioning nodes 108A-W and the wireless RF floor beacons 198A-D that is separate from the secondary network 107 for communication between the various RF positioning nodes 108A-W and the gateway 120. In a second example, the local wireless communication network 106 and the secondary network 107 are combined, such that the local wireless communication network 106 is for communications between both the RF positioning nodes 108A-W and the wireless RF floor beacons 198A-D; and the various RF positioning nodes 108A-W and the gateway 120.

Although other radio technologies may be used, the example utilizes Bluetooth™ radios. Although other types of networking or protocols may be utilized, the example local wireless communication network 106 implements a "flooding" type wireless protocol. Other example network protocols include "star", "bus", "ring", and "mesh" type wireless protocols.

Although the local wireless communication network 106 may use other networking technologies or protocols, the example local wireless communication network 106 is a flooding (e.g. non-routed) type nodal wireless network. In such an example, the nodal local wireless communication network 106 implements a flooding type protocol so as to distribute a transmitted packet from any source on the network throughout the local wireless communication network 106. The gateway 120, for example, is configured to introduce each downstream message packet into the local wireless communication network 106, and the flooding through the local wireless communication network 106 distributes the packet to all of the lighting system elements 109 on that local wireless communication network 106. The payload of the packet is extracted and utilized ("consumed") by each lighting system element 109 for which the payload is intended, e.g. based on a destination address of the packet, a group address in the packet, or a node type identifier in the packet. If the same protocol is used for packet communications from the lighting system elements 109, each lighting system element 109 is configured to introduce any upstream message packet into the local wireless communication network 106, and the flooding through the local wireless communication network 106 distributes the upstream packet to gateway 120 and to all other lighting system elements 109 on that local wireless communication network 106. Typically, upstream message packets are addressed to the gateway 120, and the payloads thereof are only consumed by the gateway 120 (e.g. to receive acknowledgements of downstream transmission or to receive status reports from light fixtures or other nodes on the local wireless communication network 106). In some network architectures, such as a Bluetooth™ implementation, the local wireless communication network 106 may also support some point-to-point communications.

A subset of the lighting system elements 109U-V are lighting control devices 20A-B. These lighting control devices 20A-B are described in further detail in FIG. 6A and FIG. 6B, but the lighting control devices 20A-B also include a local wireless network communication interface 113, used to communicate with other RF positioning nodes 108A-T,W as well as the wireless RF floor beacons 198A-D.

An additional subset of the lighting system elements 109W is an occupancy, daylight, or audio sensor 45. This type of lighting system element 109W is described in further detail in FIG. 7, but briefly the occupancy, daylight or audio sensor 45 also include a micro-control unit (MCU) like the luminaire 10A in FIG. 5, along with drive/sense circuitry 535 to interface with the detectors 565 which allow the occupancy, daylight, or audio sensor 45 to sense occupancy, daylight, or audio. The occupancy, daylight, or audio sensor 45 also includes a local wireless network communication interface 113, used to communicate with other RF positioning nodes 108A-V as well as the wireless RF floor beacons 198A-D.

Some lighting system elements 109 may include sensors, and some lighting system elements 109 may include components to monitor or control equipment (e.g. equipment of a heating, ventilation and air conditioning system, access control system, surveillance and alarm system, or the like). For illustration and discussion purposes, the wireless RF floor beacon positioning system 100 is a controlled lighting system. In such a wireless RF floor beacon positioning system 100, some or all of the RF positioning nodes 108 have additional hardware for lighting-related purposes. Hence, for illustration and discussion purposes, in the example wireless RF floor beacon positioning system 100, the lighting system elements 109 take the form of luminaires 10A-T or other types of luminaires that include light sources and associated driver circuitry (as shown by way of example in FIGS. 3 and 4). Lighting control devices 20A-B, or occupancy, daylight, or audio sensors 45, are also present in this wireless RF floor beacon positioning system 100.

Wireless RF floor beacon positioning system 100 further includes a gateway 120. The gateway 120 is a device that provides access between a wide area network (WAN) 130 and the local wireless communication network 106. The WAN 130 (e.g., Internet) can be a cellular network, optical fiber, cable network, or satellite network that can be connected to via Ethernet, for example. The gateway 120 may provide routing, access, and other services for the luminaires 10A-T and other lighting system elements 109U-W residing at the indoor space 105, for example.

Figure 8:
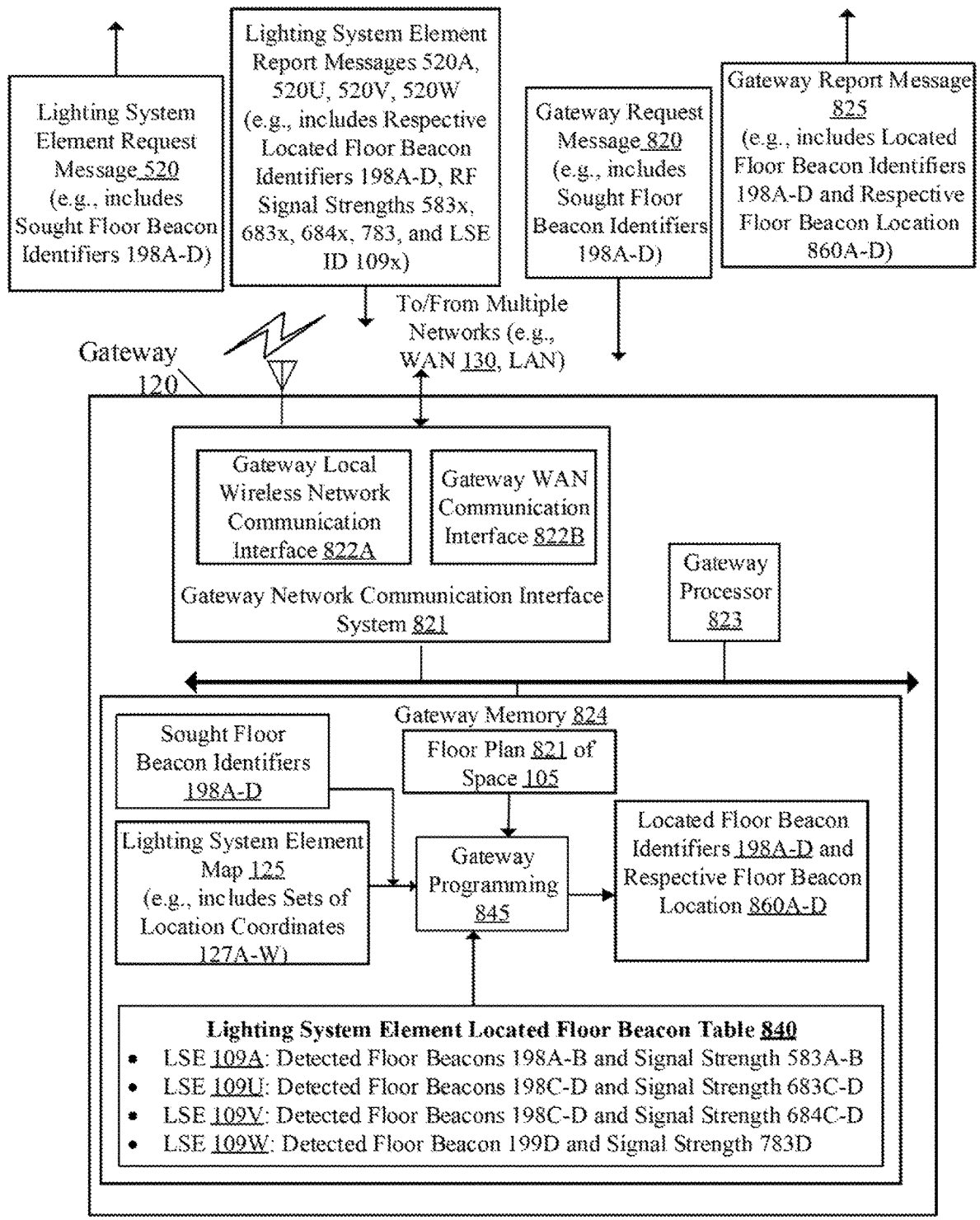
FIG. 8 is a simplified, functional block diagram of an example of a hardware platform for a gateway, as may be used in the example wireless RF floor beacon positioning system of FIG. 1.

As shown in FIG. 8, the gateway 120 includes a gateway network communication interface system 821 including a gateway local wireless network communication interface 822A configured for wireless communication over the local wireless communication network 106, the secondary network 107, or both the local wireless communication network 106 and the secondary network 107. The gateway network communication interface system 821 further includes a gateway WAN communication interface 822B for communication over the WAN 130. The gateway 120 further includes a gateway memory 824 including a lighting system map 125 of lighting system elements 109A-W in the indoor space 105. The gateway 120 additionally includes a gateway processor 823 coupled to the gateway network communication interface system 821 and the gateway memory 824. The gateway 120 further includes gateway programming 845 in the gateway memory 824.

Figure 9:
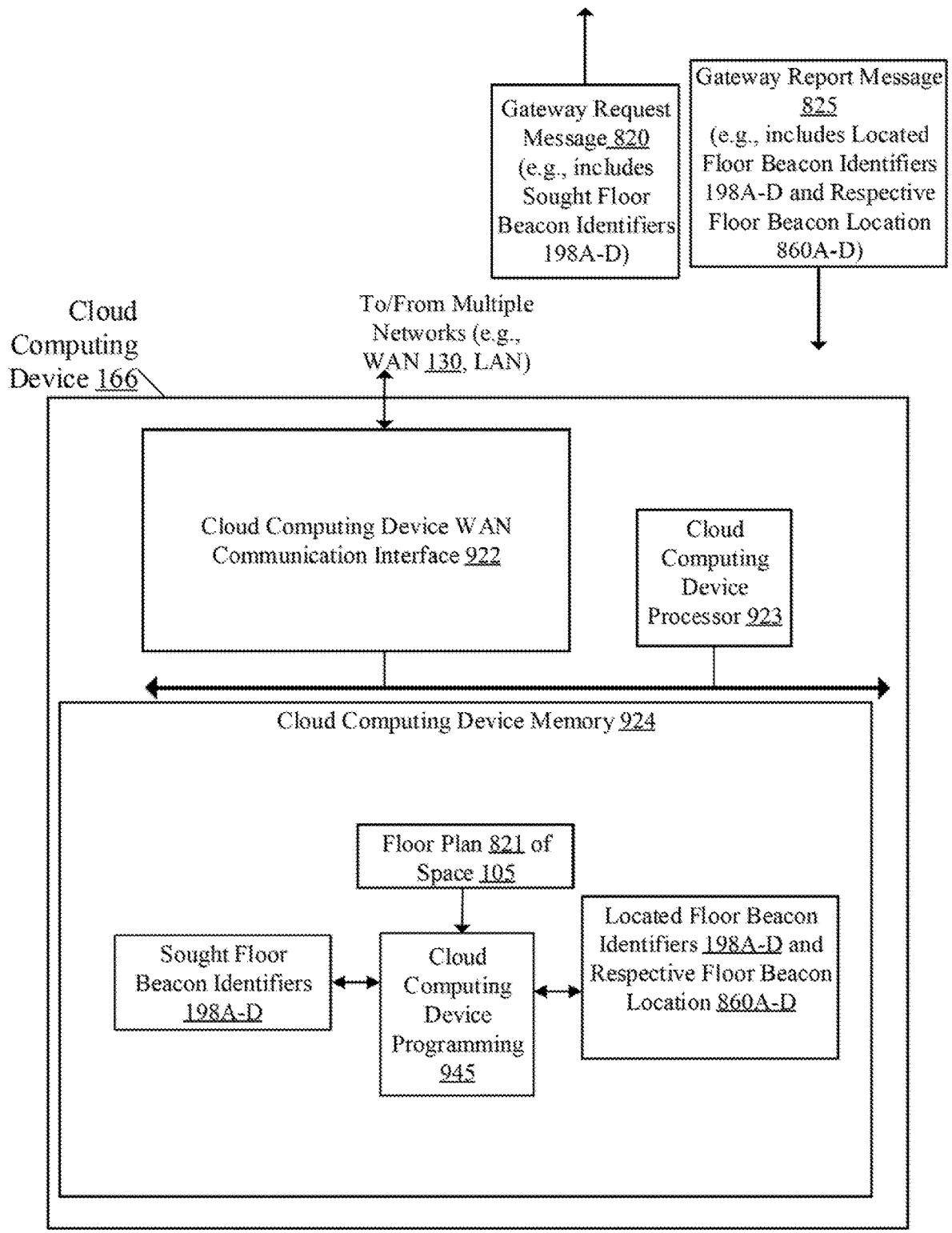
FIG. 9 is a simplified, functional block diagram of an example of a hardware platform for a cloud computing device, as may be used in the example wireless RF floor beacon positioning system of FIG. 1.

The wireless RF floor beacon positioning system 100 further includes a cloud computing device 166, and the cloud computing device 166 resides off-premises in the cloud 165 meaning the cloud computing device 166 is a remote server hosted on the Internet to store, manage, and process data, rather than the local gateway 120. As shown in FIG. 9, the cloud computing device 166 includes a cloud computing device wide area network (WAN) communication interface configured 922 for communication over a WAN 130. The cloud computing device 166 further includes a cloud computing device memory 924 and a cloud computing device processor 923 coupled to the cloud computing device WAN communication interface 922 and the cloud computing device memory 924. The cloud computing device 166 further includes cloud computing device programming 945 in the cloud computing device memory 924.

Gateway 120 is in communication with a cloud computing device 166 via the WAN 130 to locate the wireless RF beacons 198A-D. In some examples, the gateway 120 is a conduit that sends collected data to the cloud computing device 166, which actually locates the wireless RF beacon nodes 198A-D. However, in another example, the cloud computing device 166 is not needed or does not exist, and the gateway 120 itself may locate the wireless RF beacon nodes 198A-D. In examples with the cloud computing device 166, any function related to locating the wireless RF floor beacon 198A could be performed on either the gateway 120 or the cloud computing device 166, or in some combination of the two.

Figure 5:
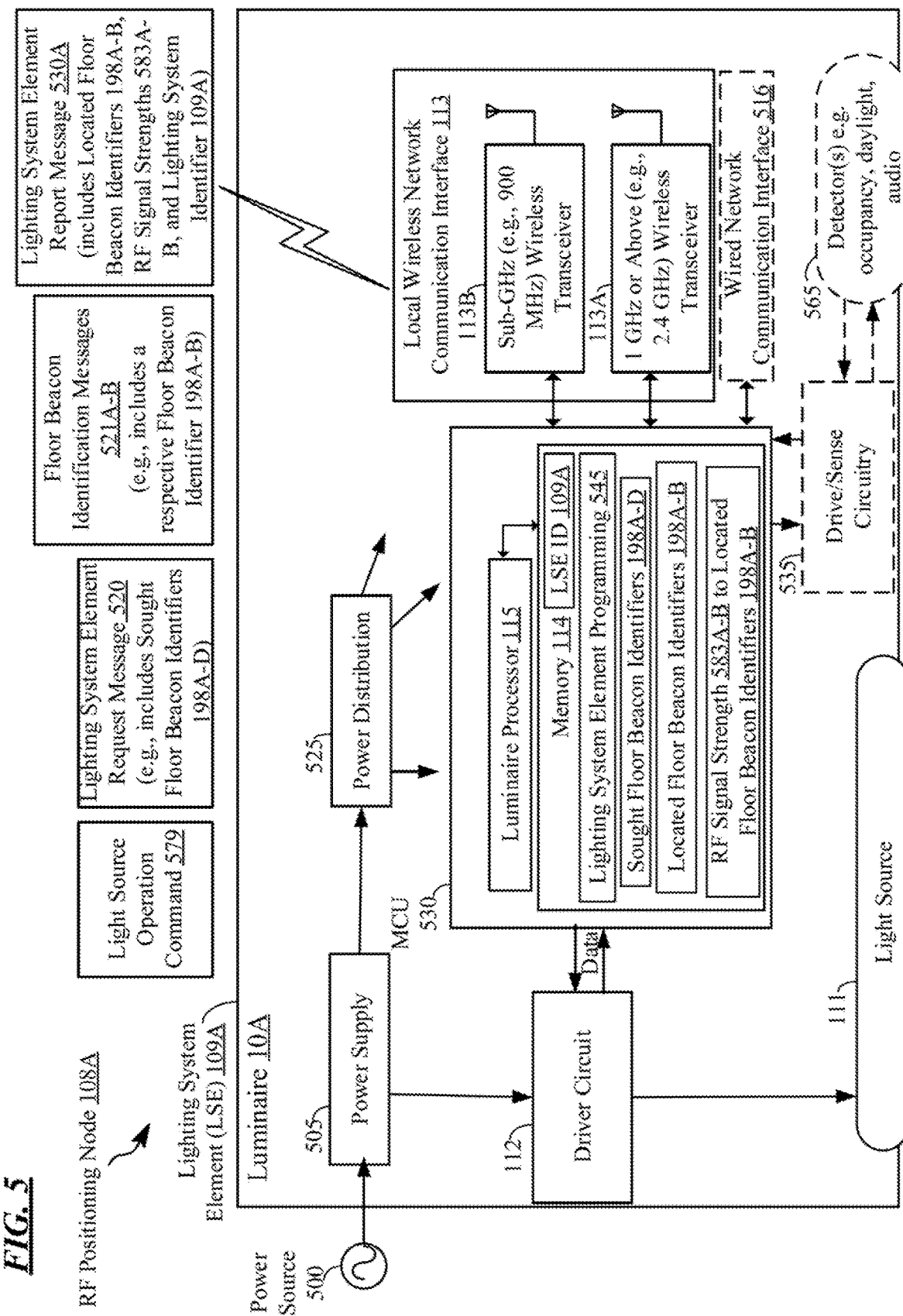
FIG. 5 is a high-level functional block diagram of a luminaire example of an RF positioning node designed to locate wireless RF floor beacons.

Therefore, FIG. 1 depicts a wireless RF floor beacon positioning system 100 comprising a plurality of floor displays (element 197B of FIG. 4) located within a space 105, as well as a plurality of wireless RF floor beacons 198A-D, wherein a respective wireless RF floor beacon 198B is coupled to a respective floor display 197B. The respective wireless RF floor beacon 198B includes a wireless RF floor beacon communication interface (element 750 of FIG. 10) configured for wireless communication over a local wireless communication network 106. Additionally, the respective wireless RF floor beacon 198B includes a wireless RF floor beacon processor (element 743 of FIG. 10) coupled to communicate via the wireless RF floor beacon communication interface 750. Further the respective wireless RF floor beacon 198B includes a wireless RF floor beacon memory (element 742 of FIG. 10) accessible to the wireless RF floor beacon processor 743 and including a respective wireless RF floor beacon identifier (element 198B of FIG. 10), and wireless RF floor beacon programming (element 754 of FIG. 10) in the wireless RF floor beacon memory 742, wherein execution of the wireless RF floor beacon programming (element 754 of FIG. 10) by the wireless RF floor beacon processor 743 of the wireless RF floor beacon 198B configures the respective wireless RF floor beacon 198B to implement functions. The functions include the wireless RF floor beacon 198B transmitting, via the wireless RF floor beacon communication interface 750, over the local wireless communication network 106 a respective floor beacon identification message 521B including the respective wireless RF beacon identifier 198B within a respective RF range (element 760 of FIG. 10);

The wireless RF floor beacon positioning system 100 further comprises a plurality of lighting system elements 109A-W located in the space 105 that are connected together over the local wireless communication network 106, wherein a respective lighting system element 109A includes at least one lighting system element local wireless network communication interface 113, configured for wireless communication over the local wireless communication network 106, a secondary network 107, or both the local wireless communication network 106 and the secondary network 107; a lighting system element memory 114; a lighting system element processor 115 coupled to communicate via the lighting system element local network communication interface 113; and a lighting system element memory 114 accessible to the lighting system element processor 115 and including a respective lighting system element identifier (element 109A of FIG. 5). The lighting system element memory 114 further includes lighting system element programming (element 545 of FIG. 5) in the lighting system element memory 114, wherein execution of the lighting system element programming 545 by the lighting system element processor 115 of the respective lighting system element configures the respective lighting system element to implement functions. The functions include the lighting system element 109A receiving, via the local wireless communication network 106, a lighting system element request message 520 (e.g., RF beacon locate message) from a gateway 120 to detect a subset or all of the wireless RF floor beacons 198A-D. The lighting system element request message 520 from the gateway 120 includes a plurality of sought wireless RF floor beacon identifiers (element 198A-D of FIG. 10) to detect. In response to receiving the lighting system element request message, the lighting system element 109A receives, via the local wireless communication network 106, the respective floor beacon identification message 521B including a detected respective wireless RF beacon identifier 198B transmitted from a detected respective wireless RF floor beacon 198B. The lighting system element 109A also determines a respective RF signal strength 583B between the detected respective wireless RF floor beacon 198B from the respective lighting system element 109A based on the respective floor beacon identification message 521B. Additionally, the lighting system element 109A transmits, via the local wireless communication network 106, to the gateway 120 a respective lighting system element report message 530A including the detected respective wireless RF beacon identifier 198B of the detected respective wireless RF floor beacon 198B, the respective RF signal strength 583B, and the respective lighting system element identifier 109A.

The lighting system elements 109A-W of the wireless RF floor beacon positioning system 100 include a luminaire 10A, a lighting control device 20A, or an occupancy, daylight, or audio sensor 45. Additionally, the local wireless communication network 106 is configured to transmit a light source operation command 579 from the lighting control device 20A or the occupancy, daylight, or audio sensor 45 to the luminaire 10A to control an artificial illumination lighting (e.g. light source 111) of the luminaire 10A.

FIG. 2A is a schematic of the luminaire-based positioning system of FIG. 1 that includes a visual layout of twenty-three initially luminaires 10A-T, lighting control devices 20A-B, and an occupancy, daylight, or audio sensor 45 as represented by a respective set of location coordinates 127A-W. As described in FIG. 1, the luminaires 10A-T are also lighting system elements 109A-T, as well as RF positioning nodes 108A-T. The lighting control devices 20A-B are also lighting system elements 109U-V, as well as RF positioning nodes 108U-V. The occupancy, daylight, or audio sensor 45 is also a lighting system element 109W as well as an RF positioning node 108W. As shown, the respective set of location coordinates 127A-W are located on a two-dimensional Cartesian coordinate system, which includes an X axis for horizontal (e.g., lateral) coordinate position and a Y axis for a vertical coordinate position (e.g., longitudinal). In the example of FIG. 23, all of the twenty-three luminaires 110A-T, lighting control devices 20A-B, and sensor 45 are in an operational state. An X location coordinate component of the respective set of location coordinates 127A-W ranges from 1 to 6 in the example, and the Y location coordinate component of the respective set of location coordinates 127A-W ranges from 1 to 4. The X location coordinate and the Y location coordinate cover the entire floor area of the indoor space 105, but do not identify the height of the luminaire 10A-T, lighting control device 20A-B, or sensor 45 (e.g., a Z axis component).

Wireless RF floor beacon 198A is some form of device capable of RF communication with the lighting system elements 109A-W—either actively by broadcasting in a manner that the lighting system elements 109A-W can receive via the local wireless network communication interface 113, or passively by receiving transmissions from the lighting system elements 109A-W. In the example of FIG. 2, luminaires 10A-B communicate with the wireless RF floor beacon 198A and the gateway 120 to determine a physical location 199A of the wireless RF floor beacon 198A in the indoor space 105. Generally, the wireless RF floor beacon positioning system 100 determines an initial position in the indoor space 105, shown as physical location 199A, of the wireless RF floor beacon 198A based on one or more received signal strength indicator (RSSI) data communication measurements (e.g., Bluetooth™ or WiFi) to at least one RF positioning node 10A. In this example, the initial position, shown as physical location 199A, of the wireless RF floor beacon 198A is based on one or more RSSI data communication measurements to two lighting system elements 109A-B. The farther the wireless RF floor beacon 198A is from the lighting system elements 109A-B, the lower the respective RSSI data measurement becomes. Since the set of location coordinates 127A-W of the lighting system elements 109A-W are all known, the RSSI measurements are the triangulated and/or trilaterated to calculate the physical location 199B of the wireless RF floor beacon 198B within the indoor space 105 when three or more lighting system elements 109A,B,G,H are able to collect RSSI data measurements. However, trilateralization with two lighting system elements 109A-B to calculate that the physical position 198A of the wireless RF floor beacon 198A is between two ambiguous points is still valuable for the purposes of locating that wireless RF floor beacon 198A. Furthermore, even a case where only a single lighting system element 109 is able to collect RSSI data measurements of a given wireless RF floor beacon 198 is still valuable, as it confirms that the wireless RF floor beacon 198 is within a given radius.

As shown in the specific example of FIG. 2A, there are four wireless RF floor beacons 198A-D within the indoor space 105 at four different physical locations 199A-D. For the different wireless RF floor beacon 198A-D, different lighting system elements 109A-W are used to take the RSSI measurements in order to determine the physical locations 198A-D. The known sets of location coordinates 127A-W of those lighting system elements 109A-W and RSSI measurements are then used to calculate the physical location 199B-D of the wireless RF floor beacon 198B-D using triangulation and/or trilateration, or to estimate the physical location 199A of the wireless RF floor beacon 198A when less than three lighting system elements 109A-W are able to collect RSSI data measurements for a given RF floor beacon 198A.

This is one is just one possible use of a set of luminaires 10 as the lighting system elements 109. The luminaires 10 could be streetlights in an outdoor space, which are dimmed on or off. In some examples, the lighting system elements 109 are BLE wireless beacons or other wireless RF devices. For example, this beacon-tracking technique could be used with wireless beacons that are not luminaires 10 or even lighting system elements 109, but rather more general RF positioning nodes. As another alternative, the beacon-tracking technique can be used with lighting system elements 109, but not in a positioning system, and instead where the physical location coordinates 127A-W of the lighting system elements 109A-W is needed to set up zones for dimming of a lighting system.

For the physical location 199A, the RSSI measurements taken are between the wireless RF floor beacon 198A and lighting system elements 109A-B, and the physical location 199A is estimated using the sets of location coordinates 127A-B. For the physical location 199B, the RSSI measurements taken are between the wireless RF floor beacon 198B and lighting system elements 109G, 109H, 109M, and 109N and the physical location 199B is triangulated and/or trilaterated to the sets of location coordinates 127G, 127H, 127M, and 127N. For the physical location 199C, the RSSI measurements taken are between the wireless RF floor beacon 198C and lighting system elements 109P, 109Q, 109U, and 109V and the physical location 199C is triangulated and/or trilaterated to the sets of location coordinates 127P, 127W, 127U, and 127V. For the physical location 199D, the RSSI measurements taken are between the wireless RF floor beacon 198D and lighting system elements 109Q, 109V, and 109W and the physical location 199D is triangulated and/or trilaterated to the sets of location coordinates 127Q, 127V, 127W.

Because the gateway 120 has the lighting system node map 125, the calculation of the physical location 199A-D of the wireless RF floor beacons 198A-D is implemented on gateway 120. Thus, the wireless RF floor beacon 198A-D is in communication with the gateway 120 via the local wireless communication network 106. However, in some examples, if the lighting system elements 109A-W include the luminaire node map 125, then the calculation of the physical location 199A-D of the wireless RF floor beacon 198A-D can be implemented in the lighting system elements 109A-W. In yet another example, the wireless RF floor beacon 198B itself implements the calculation of the physical location 199B. In an additional example, the wireless RF floor beacon 198C may be in communication with the cloud computing device 166 via the gateway 120, and the cloud computing device 166 calculates the physical location 199C of the wireless RF floor beacon 198C, which is sent back to the wireless RF floor beacon 198C via the gateway 120 over the local wireless communication network 106.

Furthermore, some examples implement the gateway 120 within a mobile device or smartphone, such as an Android phone or an iPhone. In these examples, the mobile device is configured to act as a gateway 120 and is able to communicate with the cloud computing device 166 and WAN 130. In such an example, the wireless RF floor beacon 198A transmits the wireless RF floor beacon identifier 198A to a mobile device configured to act as a gateway 120, which is locating the wireless RF floor beacon 198A. The gateway 120 calculates the physical location 199A of the wireless RF floor beacon 198A by utilizing the lighting system elements 109A-W. Alternatively, the wireless floor beacon 198B calculates the physical location 199B of the wireless RF floor beacon 198B by utilizing the lighting system elements 109A-W, and then transmits the physical location 199B to the mobile device configured to act as a gateway 120. The wireless floor beacon 198B may ultimately send the calculated physical location 199B of the wireless floor beacon 198B via the lighting system elements 109A-W, a WAN 130 which may include the internet or a mobile communication network, the cloud computing device 166, or additional gateways 120 before the calculated physical location 199B of the wireless floor beacon 198B arrives at the mobile device configured to act as a gateway 120.

Although the RSSI measurements are based on radio frequency (RF) waves, in some examples different ranges in the electromagnetic spectrum can be used for positioning of the wireless RF floor beacons 198A-B. Thus alternatively, visible light modulation of the light source 111 of the luminaires 10A-T, for example, as disclosed in U.S. Pat. No. 9,287,976; titled "Independent Beacon Based Light Position System," issued Mar. 15, 2016 can be used for positioning the wireless RF floor beacon 198A-B. The calculation of the physical locations 199A-B in the indoor space 105 using VLC light waves is similar to RF waves—triangulation and/or trilateration of the RSSI measurements between the wireless RF floor beacon 198B to three or more luminaires 10A,B,G,H whose sets of location coordinates 127A,B,G,H are known is used. For example, the light source 111 may be coupled to a light modulator for visible light communication (VLC). VLC technologies for indoor positioning in the indoor space 105 to determine the position of a wireless RF floor beacon 198 are available from Qualcomm Inc. under the trade name Lumicast™. VLC can be done by having luminaires 10A-T output oscillating light (e.g., projection of a barcode) in combination with the illumination space lighting.

FIG. 2B is the luminaire node map 125 of the wireless RF floor beacon positioning system 100 of FIGS. 1, and 2A depicted in a table format. Each of the twenty-three lighting system elements 109A-W (i.e. the twenty-three RF positioning nodes 108A-W) is assigned a luminaire position 1-23 in the luminaire node map 125 ranging from one to twenty-three. The twenty-three positions cover the entire area of the indoor space 105 for which positioning of the wireless RF floor beacons 198A-D is desired. As shown, the lighting system identifier settings column stores lighting system identifiers 109A-W. The set of location coordinates 127A-W include two components: an X location coordinate and a Y location coordinate for each of the lighting system elements 109A-W.

The luminaire node map 125 includes a respective lighting system element identifier setting 109A-W of each lighting system element 109A-W in the indoor space 105. The lighting system element node map 125 also has multiple sets of location coordinates 127A-W. Each set of location coordinates 127A-W is stored in association with the respective lighting system element identifier 109A-W. A two-dimensional Cartesian coordinate system is used in the example lighting system element node map 125 for each of the sets of location coordinates 127A-W. However, a three-dimensional coordinate system can be used which includes an additional component along a Z axis for depth or height measurement. For example, if the indoor space 105 is a grocery store it can be advantageous to know whether the wireless RF floor beacon 198B is at floor level or near or at the ceiling level. A grocery store aisle may include several objects of interest, such a cereal boxes stacked on top of various shelves of an aisle, in which case only knowing the X location coordinate and the Y location coordinate is useful, but also knowing the Z location coordinate is even more useful. This can be combined with a floor plan (element 821 of FIG. 8) of the space 105 to improve data usability.

FIG. 3 is an isometric view of a luminaire 10A mounted in the indoor space 105. In the example of FIG. 3, the drop light fixture type luminaire 10A was hung below the ceiling by multiple support rods or cables attached to a number of brackets on the luminaire 10A. The example of FIG. 3 represents a pendant type light fixture implementation of the luminaire 10A in which the fixture has a bracket on a surface opposite the artificial illumination lighting output, providing an attachment point for a single strut attached to or through the ceiling. Other aspects of structure, orientation and operation of the luminaire 10A are generally similar to those of the luminaires 10A-T discussed herein. Location of electronics should be decided (e.g. in ceiling or on fixture) size and weight considerations, since fixture weight may be an issue. For example, the electronics of the lighting device may be in the suspended luminaire portion or included in or near the support structure in our above the ceiling to reduce the weight held below the ceiling by the support(s) and bracket(s).

Therefore, FIG. 3 depicts at least one of the lighting system elements 109A as a luminaire 10A. The luminaire 10A is ceiling-mounted, and includes a light source 111 to emit the artificial illumination lighting, a driver circuit (element 112 of FIG. 5) coupled to the light source 111 to control light source operation of the light source 111, and a power supply (element 505 of FIG. 5) driven by a line power source (element 500 of FIG. 5). Additionally, the lighting system element 109A local wireless network communication interface 113 of the luminaire 10A receives incoming light source operation commands over the local wireless communication network 106.

Figure 4:
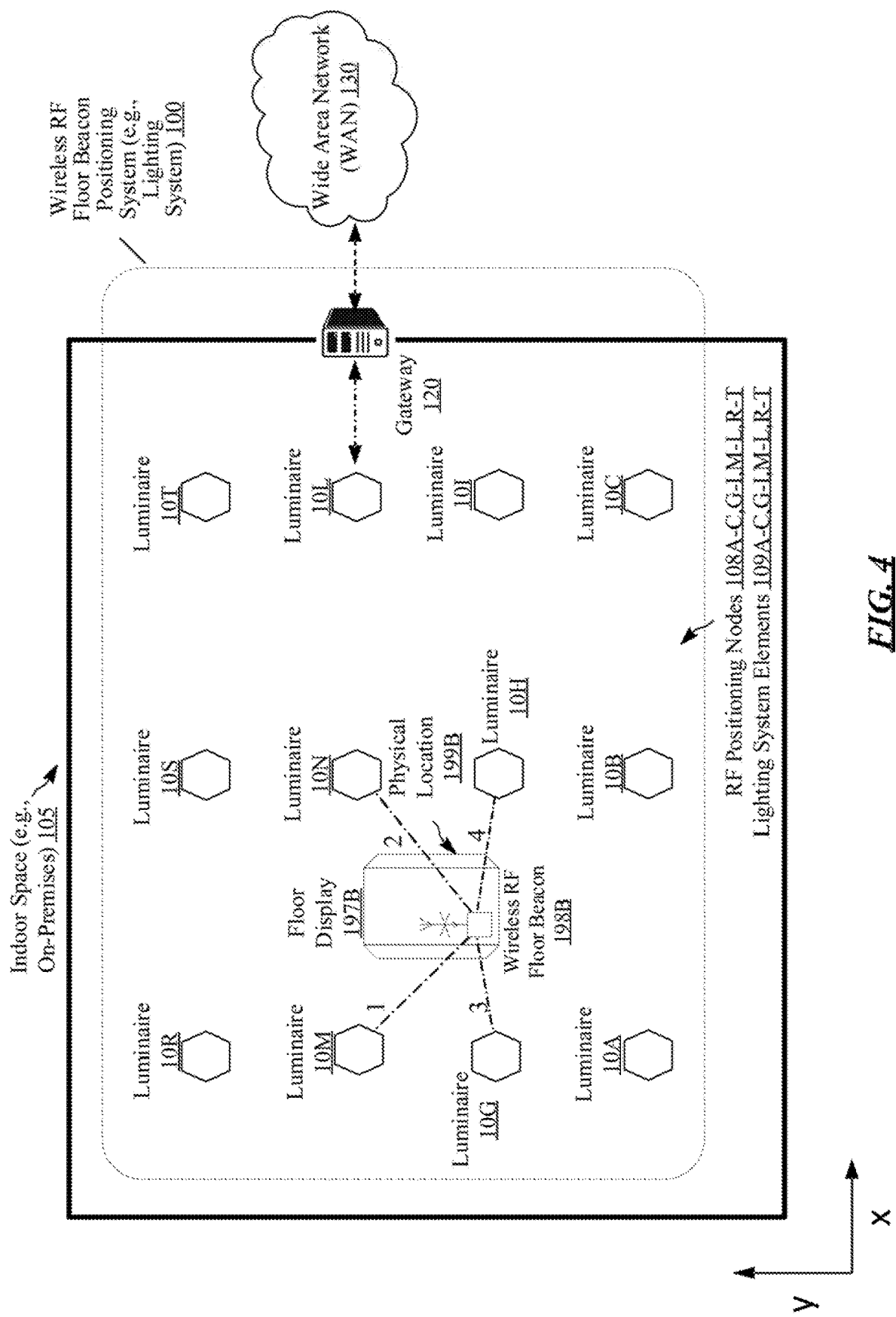
FIG. 4 is an overhead diagram of a room with a multiple RF lighting system node network locating a wireless RF floor beacon.

FIG. 4 illustrates a diagram of the wireless RF floor beacon positioning system 100 including ceiling-based luminaires 10A-C,G-I,M-L,R-T (i.e. radio-frequency (RF) lighting system elements 109A-C,G-I,M-L,R-T), a wireless RF floor beacon 198B, and a gateway 120, all within a space 105, such as a retail store. In this example, the wireless RF floor beacon 198B is attached to an endcap floor display 197B that is manufactured and packaged by a vendor company, for example a holiday gift vendor.

A worker can be tasked to place wireless RF floor beacons 198 in certain locations and to record and report those physical locations 199 or manually report back the state of these floor displays 197 on the retail floor. This approach is labor-intensive, vulnerable to human error, and does not prevent these floor displays 197 from being later moved from their set positions. Alternatively or additionally, workers can use mobile devices (e.g., phones equipped with appropriate software) to locate wireless RF floor beacons 198, but this also is labor-intensive.

In this example the holiday gift vendor and the owner of the space 105, a department store, have an agreement to display the endcap floor display 197B at the front of the space for the first two weeks in May. The agreement is for the holiday gift vendor to ship the floor display 197B connected to the wireless RF floor beacon 198B to the department store one week before May, allowing the department store approximately a week to properly install the floor display 197B at the front of the space 105 for two weeks in May.

Here, the holiday gift vendor has paid a flat fee per floor display 197 for this two week, front of space 105 endcap placement. Therefore, the vendor would like to confirm that their floor display 197B actually made it to the space 105, and was actually installed at the front of the space 105. The vendor is able to do this by partnering with an owner of a wireless RF floor beacon positioning system 100. The wireless RF floor beacon positioning system 100 is installed in the space 105, and aids the department store in the space 105 in some aspect of their operation: perhaps the system also provides lighting to the space 105, or the system aids in tracking expensive merchandise. Regardless, the wireless RF floor beacon positioning system 100 is configured to track the wireless RF floor beacon 198B attached to the endcap floor display 197B that is supposed to be delivered and installed in the space 105, specifically at the front of the store.

Figure 10:
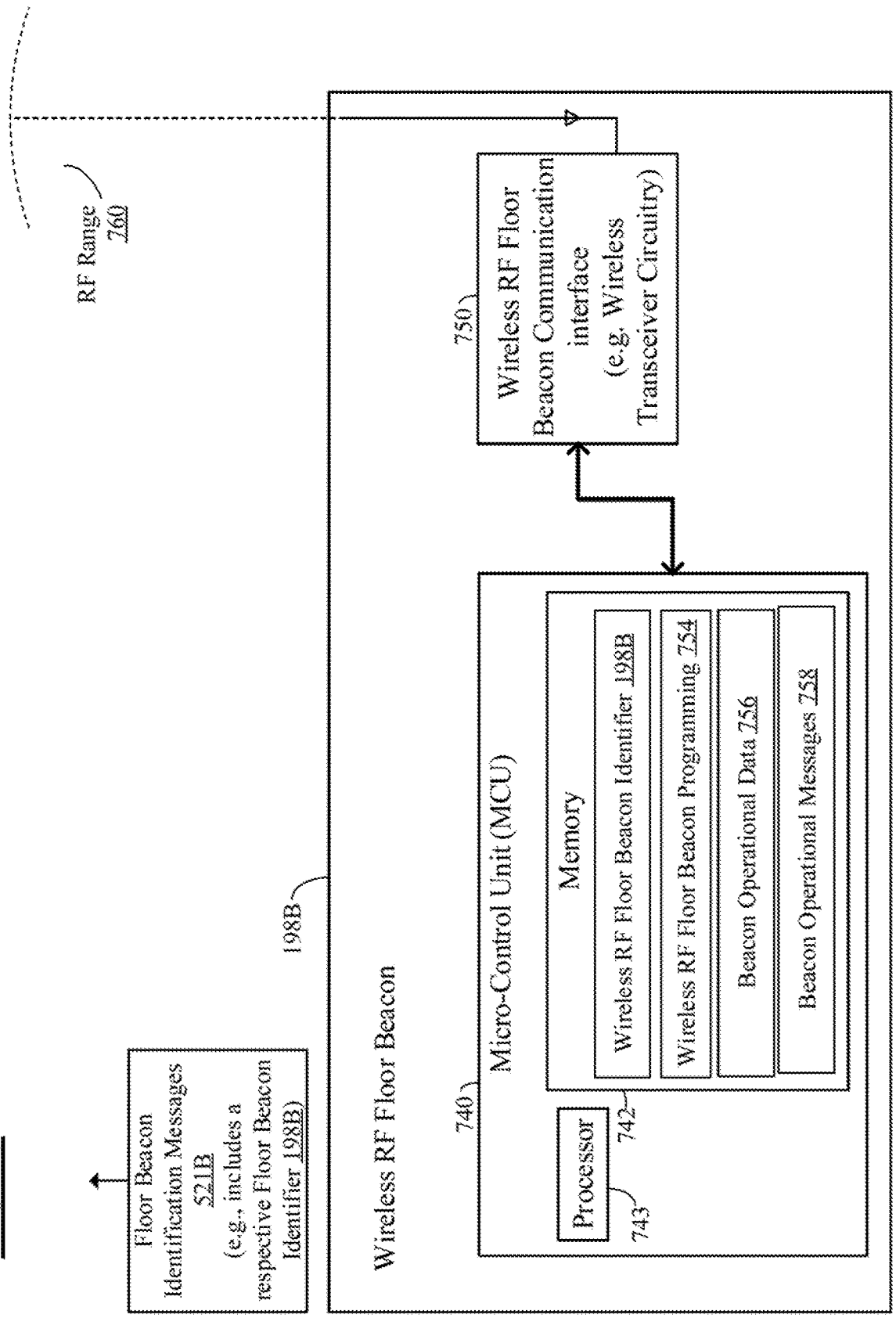
FIG. 10 is a high-level functional block diagram of an example of a wireless RF floor beacon of FIG. 1.

The wireless RF floor beacon positioning system 100 enables the rapid, repeated, wireless remote locating of a sought-after wireless RF floor beacon 198 that broadcasts a previously known identification (ID) code (floor beacon identifier 198A of FIG. 10). It does so by using the lighting system elements 109 of a local wireless communication network 106 to detect self-identifying broadcasts of the wireless RF floor beacon 198B. These broadcasts are floor beacon identification messages (element 521B of FIG. 5), which the lighting system element 109 stores in memory 114 along the located floor beacon identifiers (element 198B of FIG. 5). In addition, the gateway 120 stores in gateway memory 824 the located floor beacon identifiers (element 198B of FIG. 8) as well.

Next, the wireless RF floor beacon positioning system 100 tests for a match between located floor beacon identifiers (element 198B of FIG. 5) and a sought floor beacon identifiers (element 198B of FIG. 5), and report (e.g., to a gateway 120 or cloud computing device 166) both the physical locations 127G,H,M,N of luminaires 10G,H,M,N that detect a sought floor beacon identifier 198B and may contain the received signal strength (RSSI) value of that signal as measured by the luminaires 10G,H,M,N. A device such as the gateway 120 or the cloud computing device 166 uses it to calculate an estimated position 199B for the detected wireless RF floor beacon 198B. This estimate may then be reported (e.g., for a fee) to an owner-operator of the wireless RF floor beacon 198B, who made the request for beacon tracking with the gateway 120 or cloud computing device 166. Multiple wireless RF floor beacons 198 can be discovered and located in this manner, preferably sequentially; wireless RF floor beacons 198 belonging to one or more parties can be so located, and the locations reported separately to the appropriate parties.

In this example, the wireless RF floor beacon 198B was provided to the holiday gift vendor by the owner of the wireless RF floor beacon positioning system 100; in other examples, the wireless RF floor beacon 198B may be provisioned by the vendor themselves, with information identifying the wireless RF floor beacon 198B provided to the owner of the wireless RF floor beacon positioning system 100. A service space 105 is equipped with a wireless network of lighting system elements 108A-C,G-I,M-L,R-T. The network communicates through a gateway device 120 which in turn communicates with the Internet or WAN 130. A command is received by the gateway to locate a floor beacon 198B broadcasting a specific ID (e.g., "10111").

Once the wireless RF floor beacon positioning system 100 needs to locate the wireless RF floor beacon 198B, the gateway 120 directs the lighting system elements 109A-C, G-I,M-L,R-T to search for the wireless RF floor beacon 198B within the space 105; The gateway 120 issues a command to all the lighting system elements 109A-C,G-I, M-L,R-T to listen for ID 10111. In this example, this direction would occur on May 1st, to confirm that the endcap floor display 197B was installed at the front of the space 105. These lighting system elements 109A-C,G-I,M-L,R-T and the wireless RF floor beacon 198B use various passive and active methods to locate and be located, to be described in later figures. Once one or more the lighting system elements 109G,H,M,N identify the wireless RF floor beacon 198B, the position of the wireless RF floor beacon 198B can be ascertained. The mere fact of detection by at least one the lighting system elements 109A-C,G-I,M-L,R-T, even absent multiple detections and/or RSS measurements, serves to localize a wireless RF floor beacon 198B to some degree; thus, incomplete information is still useful (although more complete information is better). To illustrate, knowing that the wireless RF floor beacon 198B is somewhere in the retail space 105 at all, as opposed to some other space, is worthwhile to the vendor. The wireless RF floor beacon positioning system 100 is therefore highly tolerant of imperfect detections. However, to unambiguously estimate the location of the wireless RF floor beacon 198B in this two-dimensional example, at least 3 non-collinear lighting system elements 109G,H,M,N must detect the signal of the wireless RF floor beacon 198B.

Lighting system element 109G,H,M,N (and no others) detect this ID. As more lighting system elements 109G,H, M,N identify the wireless RF floor beacon 198B, in this example a more precise physical location 199B can be determined. Some lighting system elements 109 may only be able to determine whether the wireless RF floor beacon 198 is within a certain radius of the lighting system element 109; other examples of lighting system elements 109 may be able to determine the distance the wireless RF floor beacon 198 is from the lighting system element 109; further examples of lighting system elements 109 may be able to determine the direction the wireless RF floor beacon 198 is from the lighting system element 109; still further examples may be able to determine both the distance and the direction of the wireless RF floor beacon 198 in relation to the lighting system element 109. lighting system elements 109 capable of capturing more precise distance and directional information about the wireless RF floor beacon 198 may require less assistance from other lighting system elements 109 to determine an accurate location; lighting system elements 109 incapable of detecting distance and direction of the wireless RF floor beacon 198 may need one or more other lighting system elements 109 to triangulate the position of the wireless RF floor beacon 198.

In this example, lighting system elements 109G,H,M,N have identified the wireless RF floor beacon 198B, indicating that the wireless RF floor beacon 198B is within the area searchable by those four lighting system elements 108G,H, M,N. Of note, the RSSIs detected by lighting system elements 109G,H,M,N are approximately proportional to the distances 1, 2, 3, and 4 from the wireless RF floor beacon 198B to those lighting system elements 109G,H,M,N, respectively (i.e., 3<4<1<2). No other lighting system elements 109A-C,I,L,R-T report detection (and therefore also do not report RSSIs).

All of these lighting system elements 109G,H,M,N are within the space 105, and none are at the front of the store. Therefore, even if these lighting system elements 109G,H, M,N are incapable of determining distance and direction of the wireless RF floor beacon 198B, due to the fact that these lighting system elements 109G,H,M,N detect the wireless RF floor beacon 198B, and none of the lighting system elements 109A,B near the four lighting system elements 109G,H,M,N and the front of the space 105 detect the wireless RF floor beacon 198B, the wireless RF floor beacon 198B is not at the front of the space 105, and the retailer has not properly installed the endcap floor display 197B at the right time per the agreement between the holiday gift vendor and the retailer. The gateway 120 receives lighting system element report messages (element 530A from FIG. 5), e.g., RF beacon locate responses, from the lighting system elements 109G,H,M,N indicating that the wireless RF floor beacon 198B has been located, potentially with direction and distance of the RF beacon 198B from the lighting system elements 109G,H,M,N. Next, the gateway 120 stores this information in the lighting system element located floor beacon table (element 840 of FIG. 8). In combination with the luminaire node map 125, the gateway 120 determines the respective floor beacon location (element 860B of FIG. 8) of the located wireless RF floor beacon 198B. The x-y coordinates of the lighting system elements 109G,H,M,N are known to the gateway 120 and/or another cloud computing device 166 in communication with the network 130. Through standard triangulation methods, the gateway 120 or other cloud computing device 166 can estimate the location of the wireless RF floor beacon 198 from the identities of the detecting lighting system elements 109G,H,M,N.

Following this, the gateway 120 notifies the holiday gift vendor via the WAN 130 (e.g. the internet) with the coordinates of the RF beacon 198B, and the holiday gift vendor can potentially contact the retailer to properly position the endcap floor display 197B connected to the wireless RF floor beacon 198B, or request a refund of the flat fee paid for displaying the endcap floor display 197B at the front of the space 105. The gateway 120 could also notify the retailer, allowing the retailer an opportunity to resolve the situation and not breach their contractual agreement. The holiday gift vendor may be operating a cloud computing device 166 on the cloud 165.

This wireless RF floor beacon positioning system 100 could also apply to tracking high-value goods such as electronics. An electronics vendor may have a separate insurance policy from the retailer in the space 105 that covers theft, but only if the electronics in the space 105 are properly secured. If an electronic device is connected to a wireless RF floor beacon 198, and is located by the wireless RF floor beacon positioning system 100 in the location indicated in the figure, then the electronic device may not be properly secured. In this example, the electronics vendor and retailer have agreed to locate the electronics device at the back of the space, near lighting system elements 109R,S,T. If the electronic device connected to the wireless RF floor beacon 198 is located near the middle of the space 105 near lighting system elements 109G,H,M,N, the electronic device is not stored as per the electronics vendor and retailer agreement. Therefore, if the electronic device is stolen, the retailer will be at fault for not properly positioning the electronic device at the back of the space 105, and therefore the insurance policy of the electronics vendor will not be implicated. The wireless RF floor beacon positioning system 100 could also aid in theft deterrence by tracking the position of the electronic device connected to the wireless RF floor beacon 198, and via the gateway 120 could signal an alert that the electronic device connected to the wireless RF floor beacon 198 is being or has been stolen.

This example is of a single set of lighting system elements 109 all working in concert. However, there are examples where the lighting system elements 109 are divided into one or more sub-networks, where a first portion of the plurality of lighting system elements 109A-C,G-I unable to communicate with a second portion of the plurality of the lighting system elements 109M-L,R-T. This might occur when two sub-networks are operated on behalf of separate businesses—the resources of the inter-node communication such as electricity may be borne by their respective businesses, but the gateway 120 may perform locating services across multiple sub-networks. The owner of the endcap floor display 197B connected to the wireless RF floor beacon 198B may want to track across an example Vendor A's and Vendor B's department stores. In such an example, Vendor A may have a separate sub-network from Vendor B, but nevertheless the gateway 120 may search across all sub-networks for the wireless RF floor beacon 198B.

If no detections are reported, the wireless RF floor beacon positioning system 100 may re-test (i.e., command one or more new detection efforts). If non-detection persists, the result of the inquiry is declared negative. If self-inconsistent detections are reported (e.g., in the depicted situation, if lighting system element 109I also reports a detection, and with stronger RSSI than lighting system element 109B—which is physically very unlikely), the wireless RF floor beacon positioning system 100 may re-test. If self-inconsistent detection persists, the detection result may be discarded, flagged, and/or subjected to a best-guess algorithm.

Therefore, FIG. 4 depicts the wireless RF floor beacon positioning system 100, wherein the respective wireless RF floor beacon 198B is attached, embedded, installed, or located on the respective floor display 197B.

FIG. 5 depicts a luminaire 10A. A luminaire 10A is a lighting system element 109A further comprising a light source 111. The luminaire 10A includes a micro-control unit (MCU) 530, and a local wireless network communication interface 113. As shown, MCU 530 is coupled to driver circuit 112 and controls the lighting operations of the light source 111 via the driver circuit 112. The MCU 530 includes a memory 114 (e.g. volatile RAM and non-volatile flash memory or the like) and luminaire processor 115. The memory 114 stores instructions for implanting the operations of the luminaire 10A, for lighting control operations, commissioning, maintenance, and diagnostic operations and for controlling communications and/or data processing related to functions of the wireless RF floor beacon positioning system 100 The operations are within the lighting system element programming 545. It should be noted that a digital signal processor (DSP) or field-programmable gate array (FPGA) could be suitable replacements for the MCU 530.

Luminaire 10A includes a power supply 505 driven by a power source 500. Power supply 505 receives power from the power source 500, such as an AC mains, battery, solar panel, or any other AC or DC source. Power supply 505 may include a magnetic transformer, electronic transformer, switching converter, rectifier, or any other similar type of circuit to convert an input power signal into a power signal suitable for light source 111. Light source 111 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 111 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Light fixture node 111 further includes, a driver circuit 112, for example, an intelligent light emitting diode (LED) driver circuit. Driver circuit 112 is coupled to light source 111 and drives that light source 111 by regulating the power to light source 111 by providing a constant quantity or power to light source 111 as its electrical properties change with temperature, for example. The driver circuit 112 provides power to light source 111. Driver circuit 112 may be a constant-voltage driver, constant-current driver, or AC LED driver type circuit that provides dimming through a pulse width modulation circuit and may have many channels for separate control of different LEDs or LED arrays that comprise light source 111. An example of a commercially available driver circuit 112 is manufactured by EldoLED®.

Driver circuit 112 can further include an AC or DC current source or voltage source, a regulator, an amplifier (such as a linear amplifier or switching amplifier), a buck, boost, or buck/boost converter, or any other similar type of circuit or component. Driver circuit 112 outputs a variable voltage or current to the light source 111 that may include a DC offset, such that its average value is nonzero, and/or an AC voltage.

For purposes of communication and control, luminaire 10A is treated as a single or a multi-addressable device that can be configured to operate as a member of the local wireless communication network 106. Luminaire 10A includes power distribution circuitry 525, a microcontroller 530, and a memory 114. As shown, microcontroller 530 is coupled to driver circuit 112 and the microcontroller 530 includes a processor 115 that controls the light source operation of the light source 111. Memory 114 can include volatile and non-volatile storage.

The power distribution circuitry 525 distributes power and ground voltages to the CPU 115, memory 114, local wireless network communication interface 113 (e.g., wireless transceivers 113A-B), drive/sense circuitry 535, and detector(s) 565 to provide reliable operation of the various circuitry on the luminaire 10A.

Local wireless network communication interface 113 allows for wireless data communication over various networks, including the local wireless communication network 106. For example, luminaire 10A can includes one band, dual-band, or tri-band wireless radio communication interface system of local wireless network communication interface 113 configured for wireless communication via separate radios that operate at three different frequencies, such as sub-GHz (SigFox, Lora), 2.4 GHz (Bluetooth™, WiFi 802.11b/g/n/ax, Zigbee, etc.), and 5 GHz or 5.8 GHz WiFi 802.11a/h/j/n/ac/ax, for example. At least one wireless transceiver is the 1 GHZ or above wireless transceiver 113A for communication over the local wireless communication network 106. At least one wireless transceiver is the sub-GHz wireless transceiver 113B for communication with the wireless RF floor beacons 198A-D. The 1 GHZ or above wireless transceiver 113A and the sub-GHz wireless transceiver 113B may be embodied in the same wireless transceiver, or separate wireless transceivers. Communication between the luminaire 10A and the local wireless communication network 106 may take a different format, or use different protocols, than communication between the luminaire 10A and the wireless RF floor beacons 198A-D. Alternatively, communication methods used by the luminaire 10A to communicate with the local wireless communication network 106 may overlap with the communication methods used to communicate with the wireless RF floor beacon 198A-D. Furthermore, in some examples, the luminaire 10A includes a wired network communication interface 516. This wired network communication interface 516 can facilitate communication with the gateway 120, or other lighting system elements 109B-W.

Figure 6A:
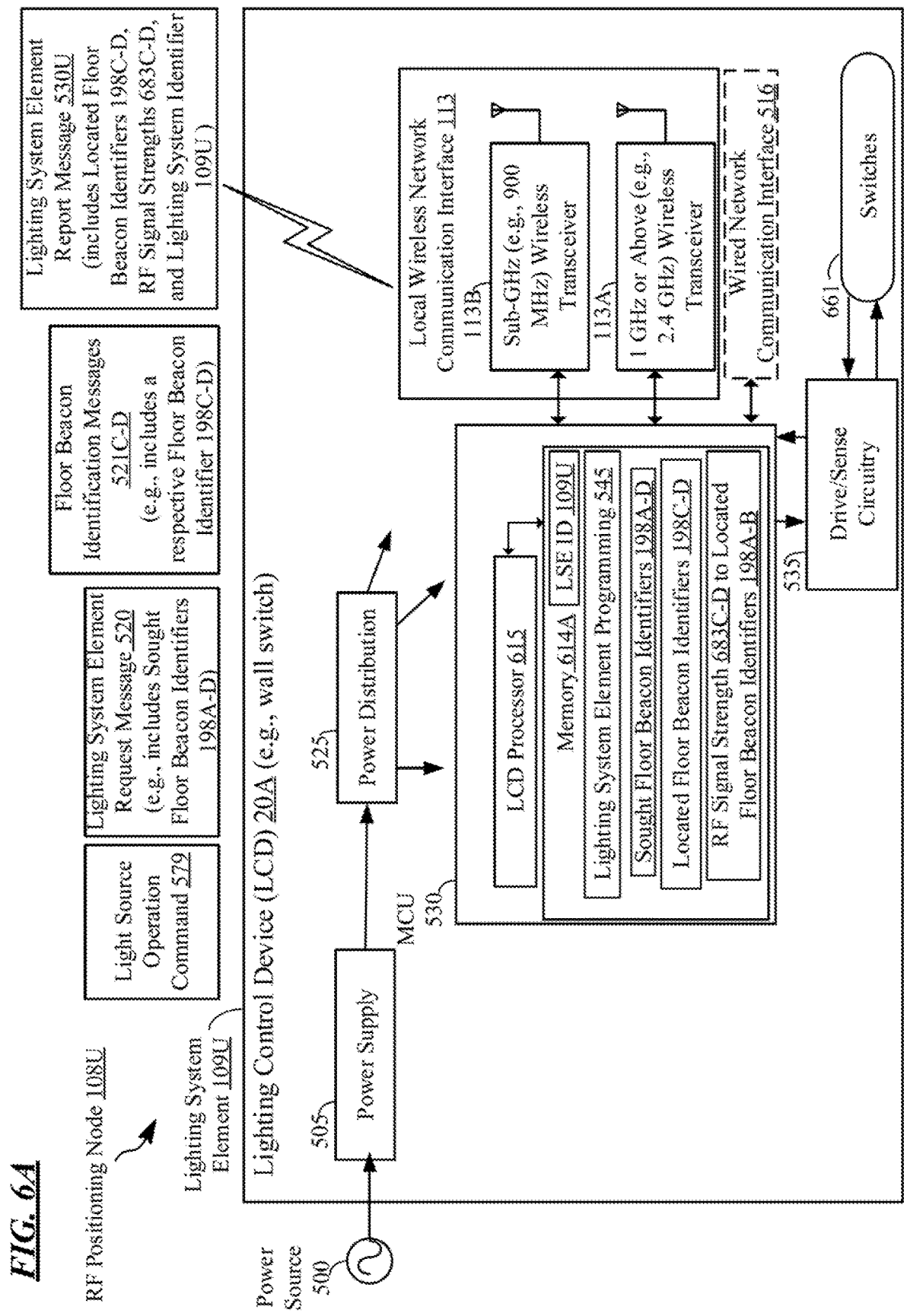
FIG. 6A is a high-level functional block diagram of a wall switch lighting control device example of an RF positioning node designed to locate wireless RF floor beacons.
Figure 6B:
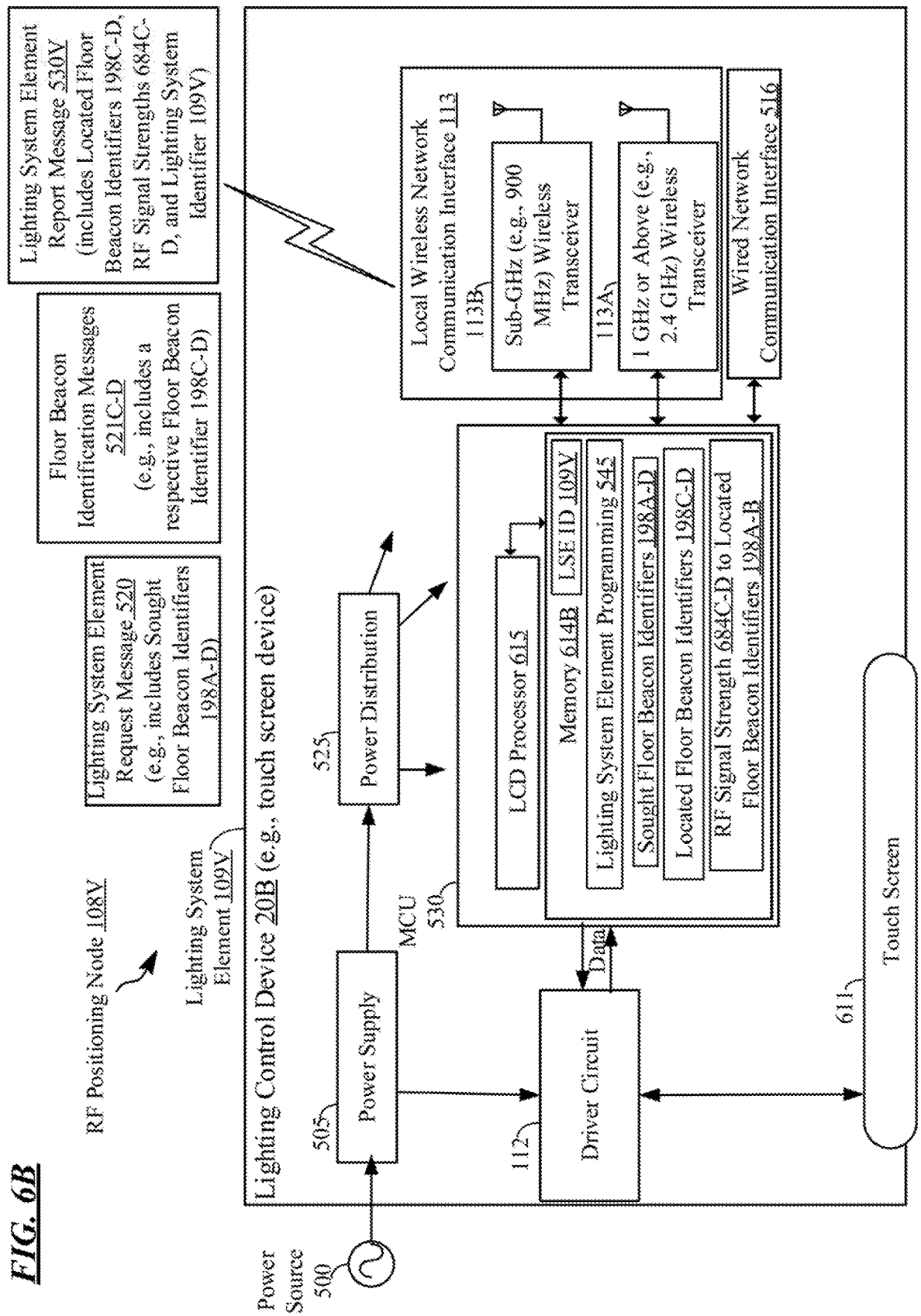
FIG. 6B is a high-level functional block diagram of a touch screen lighting control device example of an RF positioning node designed to locate wireless RF floor beacons.
Figure 7:
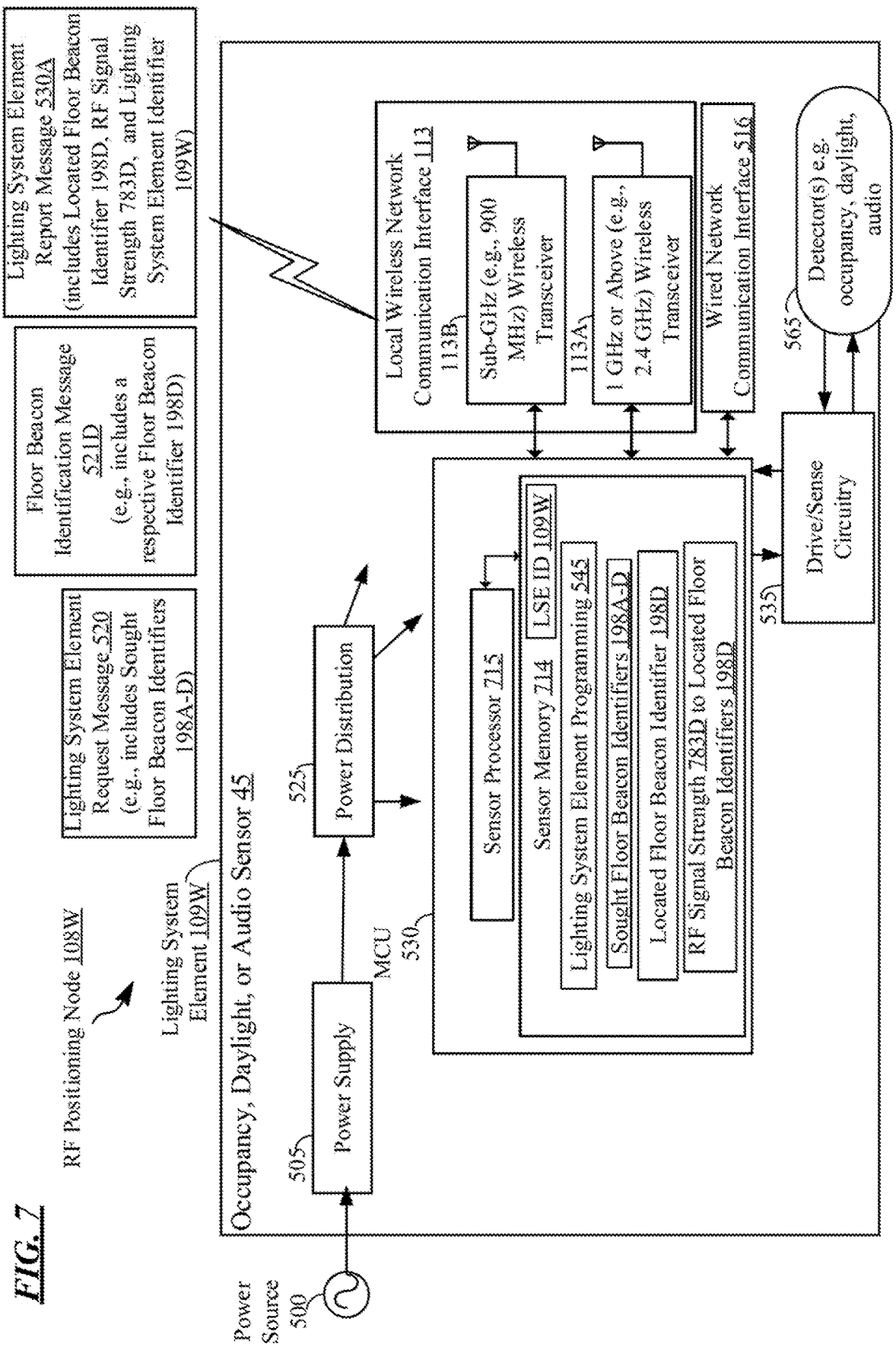
FIG. 7 is a high-level functional block diagram of an occupancy, daylight, or audio sensor example of an RF positioning node designed to locate wireless RF floor beacons.

Luminaire processor 115, including like that shown for the LCD processor 615 in FIGS. 6A-B, sensor processor 715 in FIG. 7, gateway processor 823 in FIG. 8, the cloud computing processor 923 in FIG. 9, and the wireless RF floor beacon processor 743 in FIG. 10 serve to perform various operations, for example, in accordance with instructions or programming executable by processors 115, 615, 715, 743, 823, 923. For example, such operations may include operations related to communications with various wireless RF floor beacon positioning system 100 elements, such as RF positioning nodes 108. Although a processor 115, 615, 715, 743, 823, 923 may be configured by use of hardwired logic, typical processors are general processing circuits configured by execution of programming. Processors 115, 615, 715, 743, 823, 923 include elements structured and arranged to perform one or more processing functions, typically various data processing functions. Although discrete logic components could be used, the examples utilize components forming a programmable CPU. A processor 115, 615, 715, 743, 823, 923 for example includes one or more integrated circuit (IC) chips incorporating the electronic elements to perform the functions of the CPU. The processors 115, 615, 715, 743, 823, 923 for example, may be based on any known or available microprocessor architecture, such as a Reduced Instruction Set Computing (RISC) using an ARM architecture, as commonly used today in mobile devices and other portable electronic devices. Alternatively, the processors 115, 615, 715, 743, 823, 923 for example, may be based on any known or available processor architecture, such as a Complex Instruction Set Computing (CISC) using an Intel architecture, as commonly used today in servers or personal computing devices. Of course, other processor circuitry may be used to form the CPU or processor hardware in other examples of RF positioning nodes 108.

It should be noted that a digital signal processor (DSP) or field-programmable gate array (FPGA) could be suitable replacements for the processor 115, 615, 715, 743, 823, 923. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 114, gateway memory 824 of FIG. 8, cloud computing device memory 924 of FIG. 9, wireless RF floor beacon memory 742 of FIG. 10, or a memory of a computer used to download or otherwise install such programming into the RF positioning nodes 108, or a transportable storage device or a communications medium for carrying program for installation in lighting system elements 109.

Memory 114 like that shown in FIGS. 5-7, gateway memory 824 like that shown in FIG. 8, cloud computing device memory 924 like that shown in FIG. 9, and memory 742 like that shown in FIG. 10 are for storing data and programming. In the example, the memory 114, 824, 924, 742 may include a flash memory (non-volatile or persistent storage) and a random access memory (RAM) (volatile storage). The RAM serves as short term storage for instructions and data being handled by the processor 115, 615, 715, 743, 823, 923, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Although other arrangements of processor, memory and transceivers may be used, the examples use arrangements in which, in each respective RF lighting system node 110, the node radio frequency transceiver 350, the node processor 115 and the memory 114 are elements of a single radio circuit. Such a radio circuit, for example, may include circuits for the node transceiver, node processor and node memory integrated as a single chip device referred to as a system-on-a-chip (SoC).

The instructions, programming, or application(s) may be software or firmware used to implement any other device functions associated with RF positioning nodes 108, including light system elements 109 and luminaire 10A; as well as gateway 120 and cloud computing device 166. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 114, 824, 924, 742 or a memory of a computer used to download or otherwise install such programming into the nodes 110, or a transportable storage device or a communications medium for carrying program for installation in the RF positioning nodes 108.

As shown, the luminaire 10A includes lighting system element programming 545 in the memory 114, which configures the luminaire processor 115 to control operations of the light source 111, including the communications over the local wireless network communication interface(s) 113 via the transceiver(s) 113A-B. The lighting system element programming 545 in the memory 114 includes lighting control programming to control the light source 111 and detector programming to detect motion, create motion records, and send motion records to the gateway 120.

The luminaire 10A is able to implement the hardware and software required to perform motion detection and aggregation. The luminaire 10A can communicate via the local wireless communication network 106 with the gateway 120 running the gateway programming (element 845 of FIG. 8).

Drive/sense circuitry 535 and detectors 565 are optionally on-board the luminaire 10A. Detectors 565 can be infrared sensors for occupancy or motion detection, an in-fixture daylight sensor, an audio sensor, a temperature sensor, or other environmental sensor. Drive/sense circuitry 535, such as application firmware, drives the occupancy, audio, and photo sensor hardware.

Though this RF positioning node 108A is depicted as a lighting system element 109A and a luminaire 10A, the RF positioning node 108A is not limited to being a luminaire 10A: any RF positioning node 108 that connects to the local wireless communication network 106 and has the hardware to allow fulfilling the role of an RF positioning node 108 of wireless RF floor beacon positioning system 100 is a valid RF positioning node 108.

To illustrate this, FIG. 6A shows a different lighting system element 109U: a lighting control device (LCD) 20A. This LCD 20A has a subset of the components of the luminaire 10A, and operates substantially the same way with respect to the local wireless network communication interface 113 as the luminaire 10A of FIG. 5.

As shown in FIG. 6A, lighting system element 109U can be a wall switch lighting control device 20A where the drive/sense circuitry 255 responds to switches 261. Switches 261 can be an on/off switch, dimmer switch, or set scene switch based on Acuity Brands Lighting's commercially available xPoint® Wireless ES7 product. In our some examples, wall switch lighting control device 20A includes a single shared button switch 661 for on/off, dimming, or set scene functions of wall switch lighting control device 20A. A button station can include various button settings that can have the lighting control settings adjusted, for example, four buttons can be arranged with two longitudinal buttons (north-south) and two lateral buttons (east-west).

In FIG. 6B, lighting system element 109U can be a touch screen lighting control device 20B where lighting control setting adjustments are inputted via a user interface application (not shown) through manipulation or gestures on a touch screen 611. For output purposes, the touch screen 611 includes a display screen, such as a liquid crystal display or light emitting diode (LED) screen or the like. For input purposes, touch screen 611 includes a plurality of touch sensors.

A keypad may be implemented in hardware as a physical keyboard of touch screen lighting control device 20A, and keys may correspond to hardware keys of such a keyboard. Alternatively, some or all of the keys (and keyboard) of touch screen lighting control device 20A may be implemented as "soft keys" of a virtual keyboard graphically represented in an appropriate arrangement via touch screen 611. The soft keys presented on the touch screen 611 may allow the user of touch screen lighting control device 20A to invoke the same user interface functions as with the physical hardware keys.

In general, touch screen 611 and its touch sensors (and one or more keys, if included) are used to provide a textual and graphical user interface for the touchscreen lighting control device 20A. In an example, touch screen 611 provides viewable content to the user at lighting control device 10. Touch screen 611 also enables the user to interact directly with the viewable content provided in the content display area, typically by touching the surface of the screen with a finger or an implement such as a stylus.

FIG. 7 is a block diagram of lighting system element 109W, the occupancy, daylight, or audio sensor 45. The circuitry, hardware, and software of the occupancy, daylight, or audio sensor 45 shown are similar to the normal luminaire 10A of FIG. 5, including the lighting system element programming 545, to implement the wireless RF floor beacon locating protocol described herein. Included detectors 565 can be infrared sensors for occupancy or motion detection, an in-fixture daylight sensor, an audio sensor, a temperature sensor, or other environmental sensor. Drive/sense circuitry 535, such as application firmware, drives the occupancy, audio, and photo sensor hardware, and is coupled to the sensor processor 715.

FIG. 8 is a functional block diagram of a general-purpose computer system, by way of just one example of a hardware platform that may be configured to implement the gateway 120. The example gateway 120 will generally be described as an implementation of a server platform or host type computer, e.g. as might be configured as a blade device in a server farm or in network room of a particular premises. Alternatively, the computer system may comprise a mainframe or other type of host computer system capable of web-based communications, media content distribution, or the like via a LAN or WAN 130 and the on-premises local wireless communication network 106.

The gateway 120 in the example includes a gateway processor 823; the circuitry forming the gateway processor 823 may include a single microprocessor, the circuitry forming the gateway processor 823 may include a number of microprocessors for configuring the gateway 120 as a multi-processor system, or the circuitry forming the gateway processor 823 may use a higher speed processing architecture. In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the gateway processor 823, which can include one or more cores. Although the illustrated examples of gateway processor 823 includes only one microprocessor, for convenience, a multi-processor architecture can also be used.

The main gateway memory 824 in the example is coupled to the gateway processor 823, and includes ROM, and RAM memory. In some examples the main gateway memory 824 may include cache memory if the gateway processor 823 has specialized instruction sets, branch prediction, cache line replacement techniques, or other particularized configurations designed to improve the performance of the gateway 120 the gateway processor 823 is installed within. Other memory devices may be added or substituted within the gateway memory 824, including magnetic type devices (tape or disk) and optical disk devices that may be used to provide higher volume storage.

The gateway 120 includes a gateway network communication interface system 821 including a gateway local wireless network communication interface 822A configured for wireless communication over the local wireless communication network 106. The gateway network communication interface system 821 further includes a gateway WAN communication interface 822B for communication over the WAN 130. The gateway memory 824 includes a lighting system element map 125 of lighting system elements 109A-W in the indoor space 105. The gateway 120 further includes a gateway processor 123 coupled to the gateway network communication interface system 121 and the gateway memory 124. The gateway 120 further includes gateway programming 845 in the gateway memory 124.

The gateway 120 runs a variety of applications programs and stores and processes various information in a database or the like for control of the luminaires 10A-T, lighting control devices 20A-B, occupancy, daylight, or audio sensor 45, and any other elements of the wireless RF floor beacon positioning system 100, and possibly elements of an overall building managements system (BMS) at the premises.

In operation, the gateway memory 824 stores instructions and data for execution by the gateway processor 823, although instructions and data are moved between the gateway memory 824 and the gateway processor 823. For example, the gateway memory 824 is shown storing located floor beacon identifiers 198A-D and respective floor beacon locations 860A-D. A portion or all of such a positioned located floor beacon identifiers 198A-D and respective floor beacon locations 860A-D may be transferred from gateway memory 824 and processed by the gateway processor 823 to divide the data into portions for transport as contents of a sequence of packets to be sent over the WAN 130. The gateway memory 824 stores the software gateway programming 845 as needed for execution by the gateway processor 823. When so executed, the gateway programming 845 and thus the gateway processor 823 configure the gateway 120 to perform the functions of the host computer, for relevant aspects of motion detection and aggregation described herein.

The gateway 120 also includes a gateway network communication interface system 821. The gateway network communication interface system 821 includes one or more input/output interfaces for communications, shown by way of example as a gateway local wireless network communication interface 822A for data communications via the local wireless communication network 106. In examples where the lighting system elements 109A-W utilize a wired network communication interface 516, the gateway network communication interface system 821 may have a wired connection (not shown) to communicate with one or more of the lighting system elements 109A-W utilizing a wired network communication interface 516. The gateway network communication interface system 821 also includes a gateway WAN communication interface 822B for data communications via a local area network (LAN) or WAN 130.

Although other wireless transceiver arrangements may be used within the gateway local wireless network communication interface 822A, the example gateway 120 utilizes a Bluetooth™ radio compatible with the particular iteration of Bluetooth™ protocol utilized on the wireless nodal local wireless communication network 106. The local wireless network communication interface 822A, for example, may be a Bluetooth™ radio of a lighting system element 111 or a further type radio specifically adapted for integration and operation in a computing device like that used for the gateway 120 that also is compatible with the applicable Bluetooth™ protocol. Each gateway WAN communication interface 822B may be a high-speed modem, an Ethernet (optical, cable or wireless) card or any other appropriate data communications device. The physical communication link(s) to/from the gateway WAN communication interface 822B may be optical, wired, or wireless (e.g., via satellite or cellular network).

Although not shown, the computer platform configured as the gateway 120 may further include appropriate input/output ports for interconnection with a local display and a keyboard and mouse or with a touchscreen or the like, serving as a local user interface for configuration, programming or trouble-shooting purposes. Alternatively, system operations personnel may interact with the computer system of the gateway 120 for control and programming of the wireless RF floor beacon positioning system 100 from a remote terminal device via the Internet or some other link via any network 130.

The example FIG. 8 show a single instance of a gateway 120. Of course, the functions of the gateway 120 may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway 120 generally are conventional in nature, and it is presumed that those skilled in the art are sufficiently familiar therewith to understand implementation of the present system and associated lighting control technique using suitable configuration and/or programming of such computer platform(s) based on the description above and the accompanying drawings.

Therefore, FIG. 8 depicts the wireless RF floor beacon positioning system 100 of FIG. 1, wherein the gateway 120 includes a gateway network communication interface system 821, which includes a gateway local wireless network communication interface 822A, configured for wireless communication over the local wireless communication network 106, as well as a gateway WAN communication interface 822B for communication over the WAN;

The gateway 120 additionally includes a gateway memory 824 which includes a lighting system element map 125 of the lighting system elements 109A-W in the space 105. The lighting system element map 125 further includes a respective lighting system element identifier 109A of the respective lighting system element 109A in the space 105, as well as multiple sets of location coordinates 127A-W, each respective set of location coordinates 127A stored in association with the respective lighting system element identifier 109A. The gateway memory 824 also includes a plurality of sought wireless RF floor beacon identifiers 198A-D of sought wireless RF floor beacons to detect, as well as a floor plan 821 of the space 105.

The gateway 120 includes a gateway processor 823 coupled to the gateway memory 824 and coupled to communicate via the gateway local network communication interface 822A. There is gateway programming 845 in the gateway memory 824, wherein execution of the gateway programming 845 by the gateway processor 823 of the gateway 120 configures the gateway 120 to implement functions. The function include the gateway 120 receiving, via the local wireless communication network 106, a plurality of lighting system element report messages 520A,U, V,W including detected wireless RF beacon identifiers 198A-D of detected wireless RF floor beacons 198A-D, the respective lighting system element report message 520A including the detected respective wireless RF beacon identifier 198A, the respective RF signal strength 583A, and the respective lighting system element identifier 109A. For the detected wireless RF beacons 198A-D, the gateway 120 calculates a respective distance between the detected respective wireless RF floor beacon 109A and each of respective neighboring lighting system elements 109A,B located within the respective RF range (element 760 of FIG. 10) based on the respective RF signal strength 583A,B. Additionally, based on the calculated respective distance to each of the respective neighboring lighting system elements 109A,B and the respective set of location coordinates 127A,B of the respective neighboring lighting system elements 109A,B, the gateway 120 estimates a respective wireless RF floor beacon location 860A of the detected respective wireless RF floor beacon 198A.

Furthermore, the gateway 120 compares the sought wireless RF beacon identifiers 198A-D with the wireless RF beacon identifiers received 198A-D in the plurality of lighting system element report messages 520A,U,V,W to determine a list of located wireless RF floor beacons 198A-D. When the gateway 120 determines the list of located wireless RF floor beacons 198A-D, the gateway 120 function to calculate the respective distance and estimate the respective wireless RF floor beacon location 860A of the detected respective wireless RF floor beacon 198A, is for only the list of located wireless RF floor beacons 198A-D.

The gateway 120 receives, via the WAN 130, the gateway request message 820 from the cloud computing device 166 that includes a plurality of sought wireless RF floor beacon identifiers 198A-D from the cloud computing device 166, and in response to receiving the gateway request message 820, the gateway 120 transmits, via the local wireless communication network 106, the lighting system element request message 520 to the plurality of lighting system elements 109A-W. Additionally, the gateway 120 transmits, via the WAN 130, to a cloud computing device 166 a gateway report message 825 including the respective wireless RF beacon identifier 198A-D of the located wireless RF floor beacons 198A-D and the estimated respective wireless RF floor beacon location 860A-D or a list of lighting node identifiers with the floor plan. The gateway 120 may alternatively transmit, via the WAN 130, to a cloud computing device the gateway report message 825.

When estimating the respective wireless RF floor beacon location 860A, the gateway 120 estimates the respective wireless RF floor beacon location 860A based on the floor plan 821 of the space 105, and additionally the gateway 120 transmits, via the local wireless communication network 106, or via the WAN 130, to a cloud computing device 166 a gateway report message 825 including the respective wireless RF floor beacon identifier 198A-D of the detected wireless RF floor beacons 198A-D and the estimated respective wireless RF floor beacon location 860A-D.

FIG. 9 is a block diagram of a cloud computing device 166 that is in communication with the wireless RF floor beacon positioning system 100 of FIGS. 1, 2A, and 4. The cloud computing device 166 includes the cloud computing device WAN communication interface 922 of communication over the WAN 130, in particular to send and receive messages with the gateway 120. The cloud computing device 166 further includes a cloud computing device processor 923, which has similar structure and general functionality to the gateway processor 823. Additionally, the cloud computing device includes the cloud computing device memory 924, which also has similar structure and general functionality to the gateway memory 824.

The cloud computing device memory 924 contains the floor plan 821 of the space 105, a list of sought beacon identifiers 198A-D to communicate to the gateway 120, and a list of located floor beacon identifiers 198A-D and respective floor beacon locations 860A-D communicated from the gateway 120, all of which are described in FIG. 8. Additionally, the cloud computing device programming 945 contains instructions as needed for execution by the cloud computing device processor 923. When executed, the cloud computing device programming 945 and thus the cloud computing device processor 923 configures the cloud computing device 166 to perform the functions of the host computer, including to transmit, via the WAN 130, a gateway request message 825 that includes the plurality of sought wireless RF floor beacon identifiers 198A-D to the gateway 120. In response to transmitting the gateway request message 820, the cloud computing device 166 receives the gateway report message 825 that includes located wireless RF floor beacon identifiers 198A-D and the respective wireless RF floor beacon location 860A-D.

The cloud computing device 166 will generally be described as an implementation of a server platform or host type computer, e.g. as might be configured as a blade device in a server farm or in network room of a particular premises. Alternatively, the computer system may comprise a mainframe or other type of host computer system capable of web-based communications, media content distribution, or the like via the WAN 130.

The cloud computing device 166 has similar abilities and constraints as the gateway 120. A distinction between the cloud computing device 166 and the gateway 120 is that the cloud computing device 166 does not communicate with the lighting system elements 109A-W, and cannot utilize the local wireless communication network 106.

Therefore, FIG. 9 depicts the cloud computing device 166 from FIG. 1, wherein the cloud computing device 166 includes a cloud computing device wide area network (WAN) communication interface 922 configured for communication over a WAN 130. Additionally, the cloud computing device includes a cloud computing device memory 924, and a cloud computing device processor 923 coupled to the cloud computing device WAN communication interface 922 and the cloud computing device memory 924. The could computing device 166 includes cloud computing device programming 945 in the cloud computing device memory 924, wherein execution of the cloud computing device programming 945 by the cloud computing device processor 923 configures the cloud computing device to implement the functions described herein.

FIG. 10 is a functional block diagram of an example of a wireless RF floor beacon 198B usable with the examples described herein. A wireless RF floor beacon 198B can be integrated into a variety of systems, and so what is depicted is a minimal wireless RF floor beacon 198B. The wireless RF floor beacon 198B includes a micro-control unit (MCU) 740 with a processor 743 and a memory 742; as well as wireless RF floor beacon communication interface 750. The MCU 740 has a similar range of properties to the MCU 530 of FIG. 5, and the wireless RF floor beacon communication interface 750 has a similar range of properties to the sub-GHZ wireless transceiver 133B of FIG. 5. In particular, the wireless RF floor beacon communication interface 750 communicates with the sub-GHZ wireless transceiver 133B. The wireless RF floor beacon communication interface 750 has an RF range 760 in which the wireless RF floor beacon 198B may broadcast: some examples of lighting system elements 109 are able to determine, when within the RF range 760, how close the wireless RF floor beacon 198B is to the lighting system element 109.

In some examples, the wireless RF floor beacon 198B is limited to being able to broadcast the beacon identifier 198B of the wireless RF floor beacon 198B via the wireless RF floor beacon communication interface 750. However, in other example, the beacon memory 742 may include beacon operational data 756. Beacon operational data 756 is data related to the wireless RF floor beacon itself 198B, and may be related to functionality of the wireless RF floor beacon 198B, such as the amount of battery power remaining in the wireless RF floor beacon 198B, or the strength of the wireless signal as perceived by the wireless RF floor beacon communication interface 750. Alternatively, it may be measurements related to the object to which the wireless RF floor beacon 198B is coupled to, such as a current temperature, a temperature history, or an impact monitor.

The wireless RF floor beacon 198B may also have wireless RF floor beacon programming 754, which when executed by the beacon processor 743 configures the wireless RF floor beacon 198B to perform functions. In some examples, the gateway 120 is able to send updated wireless RF floor beacon programming 754 to the wireless RF floor beacon 198B via the lighting system elements 109A-W. This updated wireless RF floor beacon programming 754 may adjust how often the wireless RF floor beacon 198B records a temperature, or how much electricity the wireless RF floor beacon 198B should use in transmitting messages.

Any of the steps or functionality described herein can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks or solid state, such as any of the storage devices in any computer(s) or the like, such as may be used to implement the client device, media gateway, transcoder, etc. shown in the drawings. Volatile storage media includes dynamic and static memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF), infrared (IR), and laser data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The term "real-time" is to be understood as meaning that the time difference between a cause and effect is small enough that a user of a lighting system or an industrial system would not perceive a material delay between their action (e.g. pressing a button) and the system's reaction (e.g. a light turning on or off). A real-time delay is usually considered to be a sub-second delay.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that has, comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected may lie in less than all features of any single disclosed example. Hence, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented n in various forms and examples, and that they may be applied in numerous applications, only some of which have been described herein. It is intended by the following claims to claim any and all modifications and variations that fall within the true scope of the present concepts.

The invention claimed is:

1. A wireless radio frequency (RF) floor beacon positioning system, comprising:
   a plurality of floor displays located within a space;
   a plurality of wireless RF floor beacons, wherein a respective wireless RF floor beacon is coupled to a respective floor display, the respective wireless RF floor beacon including:
      a wireless RF floor beacon communication interface configured for wireless communication over a local wireless communication network,
      a wireless RF floor beacon processor coupled to communicate via the wireless RF floor beacon communication interface,
      a wireless RF floor beacon memory accessible to the wireless RF floor beacon processor and including a respective wireless RF floor beacon identifier, and
      wireless RF floor beacon programming in the wireless RF floor beacon memory, wherein execution of the wireless RF floor beacon programming by the wireless RF floor beacon processor of the wireless RF floor beacon configures the respective wireless RF floor beacon to implement functions, including functions to:
         transmit, via the wireless RF floor beacon communication interface, over the local wireless communication network a respective floor beacon identification message including the respective wireless RF beacon identifier within a respective RF range;
   a plurality of lighting system elements located in the space that are connected together over the local wireless communication network, wherein a respective lighting system element includes:
      at least one lighting system element local wireless network communication interface, configured for wireless communication over the local wireless communication network, a secondary network, or both the local wireless communication network and the secondary network,
      a lighting system element memory,
      a lighting system element processor coupled to communicate via the lighting system element local network communication interface,
      a lighting system element memory accessible to the lighting system element processor and including a respective lighting system element identifier, and
      lighting system element programming in the lighting system element memory, wherein execution of the lighting system element programming by the lighting system element processor of the respective lighting system element configures the respective lighting system element to implement functions, including functions to:
         receive, via the local wireless communication network, a lighting system element request message from a gateway to detect a subset or all of the wireless RF floor beacons,
         in response to receiving the lighting system element request message:
            (i) receive, via the at least one local wireless communication network, the respective floor beacon identification message including a detected respective wireless RF beacon identifier transmitted from a detected respective wireless RF floor beacon, (ii) determine a respective RF signal strength between the detected respective wireless RF floor beacon from the respective lighting system element based on the respective floor beacon identification message, and (iii) transmit, via the at least one local wireless communication network or the secondary network, to the gateway a respective lighting system element report message including the detected respective wireless RF beacon identifier of the detected respective wireless RF floor beacon, the respective RF signal strength, and the respective lighting system element identifier.

2. The wireless RF floor beacon positioning system of claim 1, wherein the gateway includes:

a gateway network communication interface system, comprising a gateway local wireless network communication interface, configured for wireless communication over the local wireless communication network, the secondary network, or both the local wireless communication network and the secondary network;

a gateway memory including: a lighting system element map of the lighting system elements in the space, the lighting system element map including:
 a respective lighting system element identifier of the respective lighting system element in the space, and
 multiple sets of location coordinates, each respective set of location coordinates stored in association with the respective lighting system element identifier;

a gateway processor coupled to the gateway memory and to communicate via the gateway local network communication interface;

gateway programming in the gateway memory, wherein execution of the gateway programming by the gateway processor of the gateway configures the gateway to implement functions, including functions to:

(i) receive, via the local wireless communication network or the secondary network, a plurality of lighting system element report messages including detected wireless RF beacon identifiers of detected wireless RF floor beacons, the respective lighting system element report message including the detected respective wireless RF beacon identifier, the respective RF signal strength, and the respective lighting system element identifier;

(ii) for the detected wireless RF beacons:
 calculate a respective distance between the detected respective wireless RF floor beacon and each of respective neighboring lighting system elements located within the respective RF range based on the respective RF signal strength, and
 based on the calculated respective distance to each of the respective neighboring lighting system elements and the respective set of location coordinates of the respective neighboring lighting system elements, estimate a respective wireless RF floor beacon location of the detected respective wireless RF floor beacon.

3. The wireless RF floor beacon positioning system of claim 2, wherein:

the gateway memory includes a plurality of sought wireless RF floor beacon identifiers of sought wireless RF floor beacons to detect;

execution of the gateway programming by the gateway processor of the gateway configures the gateway to implement functions, including functions to:
 compare the sought wireless RF beacon identifiers with the wireless RF beacon identifiers received in the plurality of lighting system element report messages to determine a list of located wireless RF floor beacons;

the function to calculate the respective distance and estimate the respective wireless RF floor beacon location of the detected respective wireless RF floor beacon, is for only the list of located wireless RF floor beacons.

4. The wireless RF floor beacon positioning system of claim 3, wherein execution of the gateway programming by the gateway processor of the gateway configures the gateway to implement functions, including functions to:

transmit, via the local wireless communication network, to a cloud computing device a gateway report message including the respective wireless RF beacon identifier of the located wireless RF floor beacons and the estimated respective wireless RF floor beacon location.

5. The wireless RF floor beacon positioning system of claim 4, wherein:

the gateway memory includes a floor plan of the space; and execution of the gateway programming by the gateway processor of the gateway configures the gateway to:
 estimate the respective wireless RF floor beacon location further based on the floor plan of the space, and
 transmit, via the local wireless communication network, to a cloud computing device a gateway report message including the respective wireless RF floor beacon identifier of the detected wireless RF floor beacons and the estimated respective wireless RF floor beacon location.

6. The wireless RF floor beacon positioning system of claim 1, wherein the lighting system element request message from the gateway includes a plurality of sought wireless RF floor beacon identifiers to detect.

7. The wireless RF floor beacon positioning system of claim 6, further comprising a cloud computing device, wherein the cloud computing device includes:

a cloud computing device wide area network (WAN) communication interface configured for communication over a WAN;

a cloud computing device memory;

a cloud computing device processor coupled to the cloud computing device WAN communication interface and the cloud computing device memory; and cloud computing device programming in the cloud computing device memory, wherein execution of the cloud computing device programming by the cloud computing device processor configures the cloud computing device to implement functions, including functions to:
 transmit, via the WAN, a gateway request message that includes the plurality of sought wireless RF floor beacon identifiers to the gateway;

the gateway network communication interface system further includes a gateway WAN communication interface for communication over the WAN;

wherein execution of the gateway programming by the gateway processor of the gateway configures the gateway to implement functions, including functions to:
 receive, via the WAN, the gateway request message from the cloud computing device that includes a plurality of sought wireless RF floor beacon identifiers from the cloud computing device, and in response to receiving the gateway request message, transmit, via the local wireless communication network, the lighting system element request message to the plurality of lighting system elements.

8. The wireless RF floor beacon positioning system of claim 1, wherein the respective wireless RF floor beacon is attached, embedded, installed, or located on the respective floor display.

9. The wireless RF floor beacon positioning system of claim 1, wherein:

the lighting system elements include: (i) a luminaire, (ii) a lighting control device, or (iii) an occupancy, daylight, or audio sensor; and the local wireless communication network is configured to transmit a light source operation command from the lighting control device or the occupancy, daylight, or audio sensor to the luminaire to control an artificial illumination lighting of the luminaire.

10. The wireless RF floor beacon positioning system of claim 9, wherein:

at least one of the lighting system elements includes the luminaire;

the luminaire is ceiling-mounted;

the luminaire includes:

a light source to emit the artificial illumination lighting, a driver circuit coupled to the light source to control light source operation of the light source, and a power supply driven by a line power source; and the at least one lighting system element local wireless network communication interface of the luminaire receives the light source operation command over the local wireless communication network.

11. A wireless radio frequency (RF) floor beacon positioning system, comprising:

a plurality of floor displays located within a space;

a plurality of wireless RF floor beacons, wherein a respective wireless RF floor beacon is coupled to a respective floor display, the respective wireless RF floor beacon including:

a wireless RF floor beacon communication interface configured for wireless communication over a local wireless communication network, a wireless RF floor beacon processor coupled to communicate via the wireless RF floor beacon communication interface, a wireless RF floor beacon memory accessible to the wireless RF floor beacon processor and including a respective wireless RF floor beacon identifier, and wireless RF floor beacon programming in the wireless RF floor beacon memory, wherein execution of the wireless RF floor beacon programming by the wireless RF floor beacon processor of the wireless RF floor beacon configures the respective wireless RF floor beacon to implement functions, including functions to:

transmit, via the wireless RF floor beacon communication interface, over the local wireless communication network a respective floor beacon identification message including the respective wireless RF beacon identifier within a respective RF range;

a plurality of RF positioning nodes located in the space that are connected together over the local wireless communication network, wherein a respective RF positioning node includes:

at least one RF positioning node local wireless network communication interface, configured for wireless communication over the local wireless communication network, a secondary network, or both the local wireless communication network and the secondary network, an RF positioning node memory, an RF positioning node processor coupled to communicate via the RF positioning node local network communication interface, an RF positioning node memory accessible to the RF positioning node processor and including a respective RF positioning node identifier, and RF positioning node programming in the RF positioning node memory, wherein execution of the RF positioning node programming by the RF positioning node processor of the respective RF positioning node configures the respective RF positioning node to implement functions, including functions to:

receive, via the local wireless communication network or the secondary network, an RF positioning node request message from a gateway to detect a subset or all of the wireless RF floor beacons, in response to receiving the RF positioning node request message:

(i) receive, via the local wireless communication network, the respective floor beacon identification message including a detected respective wireless RF beacon identifier transmitted from a detected respective wireless RF floor beacon, (ii) determine a respective RF signal strength between the detected respective wireless RF floor beacon from the respective RF positioning node based on the respective floor beacon identification message, and (iii) transmit, via the local wireless communication network or the secondary network, to the gateway a respective RF positioning node report message including the detected respective wireless RF beacon identifier of the detected respective wireless RF floor beacon, the respective RF signal strength, and the respective RF positioning node identifier.

12. The wireless RF floor beacon positioning system of claim 11, wherein the gateway includes:

a gateway network communication interface system, comprising a gateway local wireless network communication interface, configured for wireless communication over the local wireless communication network, the secondary network, or both the local wireless communication network and the secondary network;

a gateway memory including: an RF positioning node map of the RF positioning nodes in the space, the RF positioning node map including:

a respective RF positioning node identifier of the respective RF positioning node in the space, and multiple sets of location coordinates, each respective set of location coordinates stored in association with the respective RF positioning node identifier;

a gateway processor coupled to the gateway memory and to communicate via the gateway local network communication interface;

gateway programming in the gateway memory, wherein execution of the gateway programming by the gateway processor of the gateway configures the gateway to implement functions, including functions to:

(i) receive, via the local wireless communication network or the secondary network, a plurality of RF positioning node report messages including detected wireless RF beacon identifiers of detected wireless RF floor beacons, the respective RF positioning node report message including the detected respective wireless RF beacon identifier, the respective RF signal strength, and the respective RF positioning node identifier;

(ii) for the detected wireless RF beacons:
calculate a respective distance between the detected respective wireless RF floor beacon and each of respective neighboring RF positioning nodes located within the respective RF range based on the respective RF signal strength, and
based on the calculated respective distance to each of the respective neighboring RF positioning nodes and the respective set of location coordinates of the respective neighboring RF positioning nodes, estimate a respective wireless RF floor beacon location of the detected respective wireless RF floor beacon.

13. The wireless RF floor beacon positioning system of claim 12, wherein:
the gateway memory includes a plurality of sought wireless RF floor beacon identifiers of sought wireless RF floor beacons to detect;
execution of the gateway programming by the gateway processor of the gateway configures the gateway to implement functions, including functions to:
compare the sought wireless RF beacon identifiers with the wireless RF beacon identifiers received in the plurality of RF positioning node report messages to determine a list of located wireless RF floor beacons;
the function to calculate the respective distance and estimate the respective wireless RF floor beacon location of the detected respective wireless RF floor beacon, is for only the list of located wireless RF floor beacons.

14. The wireless RF floor beacon positioning system of claim 13, wherein execution of the gateway programming by the gateway processor of the gateway configures the gateway to implement functions, including functions to:
transmit, via the local wireless communication network, to a cloud computing device a gateway report message including the respective wireless RF beacon identifier of the located wireless RF floor beacons and the estimated respective wireless RF floor beacon location.

15. The wireless RF floor beacon positioning system of claim 14, wherein:
the gateway memory includes a floor plan of the space; and
execution of the gateway programming by the gateway processor of the gateway configures the gateway to:
estimate the respective wireless RF floor beacon location further based on the floor plan of the space, and
transmit, via a wide area network (WAN), to a cloud computing device a gateway report message including the respective wireless RF floor beacon identifier of the detected wireless RF floor beacons and the estimated respective wireless RF floor beacon location.

16. The wireless RF floor beacon positioning system of claim 11, wherein the RF positioning node request message from the gateway includes a plurality of sought wireless RF floor beacon identifiers to detect.

17. The wireless RF floor beacon positioning system of claim 16, further comprising a cloud computing device, wherein the cloud computing device includes:
a cloud computing device wide area network (WAN) communication interface configured for communication over the WAN;
a cloud computing device memory;
a cloud computing device processor coupled to the cloud computing device WAN communication interface and the cloud computing device memory; and
cloud computing device programming in the cloud computing device memory, wherein execution of the cloud computing device programming by the cloud computing device processor configures the cloud computing device to implement functions, including functions to:
transmit, via the WAN, a gateway request message that includes the plurality of sought wireless RF floor beacon identifiers to the gateway;
the gateway network communication interface system further includes a gateway WAN communication interface for communication over the WAN;
wherein execution of the gateway programming by the gateway processor of the gateway configures the gateway to implement functions, including functions to:
receive, via the WAN, the gateway request message from the cloud computing device that includes a plurality of sought wireless RF floor beacon identifiers from the cloud computing device, and
in response to receiving the gateway request message, transmit, via the local wireless communication network, the RF positioning node request message to the plurality of RF positioning nodes.

18. The wireless RF floor beacon positioning system of claim 11, wherein the respective wireless RF floor beacon is attached, embedded, installed, or located on the respective floor display.

* * * * *